US012531599B2

(12) United States Patent
Tanaka et al.

(10) Patent No.: US 12,531,599 B2
(45) Date of Patent: *Jan. 20, 2026

(54) WIRELESS BASE STATION

(71) Applicant: SONY GROUP CORPORATION, Tokyo (JP)

(72) Inventors: Ken Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,266

(22) Filed: Feb. 19, 2024

(65) Prior Publication Data

US 2024/0195457 A1   Jun. 13, 2024

Related U.S. Application Data

(63) Continuation of application No. 17/915,916, filed as application No. PCT/JP2021/005895 on Feb. 17, 2021, now Pat. No. 11,943,011.

(30) Foreign Application Priority Data

Apr. 13, 2020 (JP) .................................. 2020-071625

(51) Int. Cl.
*H04B 7/06* (2006.01)
*H04B 7/024* (2017.01)

(52) U.S. Cl.
CPC .......... *H04B 7/024* (2013.01); *H04B 7/0617* (2013.01); *H04B 7/0626* (2013.01)

(58) Field of Classification Search
CPC ............ H04B 7/00; H04B 7/06; H04B 7/024; H04B 7/0417; H04B 7/0617;

(Continued)

(56) References Cited

U.S. PATENT DOCUMENTS

| 11,943,011 B2* | 3/2024 | Tanaka ................. H04B 7/0617 |
| 2008/0025512 A1* | 1/2008 | Nakajima ........... H04W 12/033 380/270 |
| 2012/0113897 A1 | 5/2012 | Thiele et al. |
| 2016/0192347 A1 | 6/2016 | Kobayashi et al. |
| 2021/0184817 A1 | 6/2021 | Nammi et al. |

FOREIGN PATENT DOCUMENTS

| WO | 2010/119044 A1 | 10/2010 |
| WO | 2015/037048 A1 | 3/2015 |

OTHER PUBLICATIONS

International Search Report and Written Opinion of PCT Application No. PCT/JP2021/005895, issued on May 18, 2021, 06 pages of English Translation and 07 pages of ISRWO.

(Continued)

*Primary Examiner* — Shawkat M Ali
(74) *Attorney, Agent, or Firm* — CHIP LAW GROUP

(57) ABSTRACT

A weight (weighting factor, and Matrix of Steering Vectors) for performing joint transmission together with another wireless base station is efficiently generated. The wireless base station performs the joint transmission with the another wireless base station. The wireless base station includes a wireless control unit and a communication unit. The wireless control unit generates information regarding channel state information between a terminal which is a destination at the time of performing the joint transmission and a plurality of wireless base stations which is a transmission source of the joint transmission. The communication unit transmits the information regarding the generated channel state information to the another wireless base station that performs the joint transmission.

19 Claims, 15 Drawing Sheets

(58) Field of Classification Search
CPC ....... H04B 7/0626; H04B 17/336; H04L 5/00;
H04L 5/0048; H04W 4/00; H04W 16/28;
H04W 24/02; H04W 24/08; H04W 28/16;
H04W 72/20; H04W 84/12; H04W 92/20
USPC ........ 370/252, 312; 375/219, 260, 267, 295, 375/316
See application file for complete search history.

(56) References Cited

OTHER PUBLICATIONS

Considerations on control schemes for COMP scheduling, Mitsubishi Electric, 3rd Generation Partnership Project 3GPP), TSG RAN WG1 meeting 64, Taiwan, R1-110977, Feb. 21-25, 2011, 3 pages.
Aio, et al., "Consideration on Multi-AP Sounding", Institute of Electrical and Electronics Engineers, IEEE 802.11-19/1134r1, Aug. 9, 2019, 14 pages.
Notice of Allowance for U.S. Appl. No. 17/915,916, issued on Nov. 8, 2023, 9 pages.
Non-Final Office Action for U.S. Appl. No. 17/915,916, issued on Aug. 3, 2023, 8 pages.
International Preliminary Report on Patentability of PCT Application No. PCT/JP2021/005895, issued on Oct. 27, 2022, 06 pages of English Translation and 04 pages of IPRP.
Dan Yang et al., "Multi-AP Transmission Procedure," IEEE 802.11TGbe, IEEE 082.11-19/1652r1 (Sep. 5, 2019), 13 pgs.
Sungjin Park et al., "Multi-AP Transmission Procedure," IEEE802.11 TGbe, IEEE802.11-19/0448rl (Mar. 11, 2019), 18 pgs.
Sungjin Park et al., "Setup for Multi-AP coordination," IEEE 802.11TGbe, IEEE802.1119/1895r2 (Nov. 11, 2019), 15 pgs.

* cited by examiner

*FIG. 6*

FEEDBACK INFORMATION SYNCHRONIZATION
(Feedback Info. Sync.)

| CATEGORY (Category) | ACTION (Action) | FEEDBACK INFORMATION (Feedback Info) | ... |

| DIRECTION (Direction) | WEIGHT SYNCHRONIZATION FLAG (Weight Sync. Flag) | NUMBER OF TERMINALS (STA Number) | TERMINAL INFORMATION (STA Info #1) | ... | TERMINAL INFORMATION (STA Info #$N_{STA}$) |

| AID (AID) | SS NUMBER (SS Number) |

FIG. 10

FEEDBACK INFORMATION SYNCHRONIZATION REQUEST
(Feedback Info. Sync. Request)

| FRAME CONTROL (Frame Control) | LENGTH (Length) | | SYNCHRONIZATION REQUEST (Sync. Request) | ... |
|---|---|---|---|---|

# WIRELESS BASE STATION

CROSS REFERENCE TO RELATED APPLICATIONS

This application is a continuation application of U.S. patent application Ser. No. 17/915,916 filed on Sep. 29, 2022, which is a U.S. National Phase of International Patent Application No. PCT/JP2021/005895 filed on Feb. 17, 2021, which claims priority benefit of Japanese Patent Application No. JP 2020-071625 filed in the Japan Patent Office on Apr. 13, 2020. Each of the above-referenced applications is hereby incorporated herein by reference in its entirety.

TECHNICAL FIELD

The present technology relates to a wireless base station. Specifically, the present technology relates to a wireless base station in a wireless system including a plurality of wireless base stations that performs joint transmission.

BACKGROUND ART

In a wireless LAN, within one basic service set (BSS), an access point (AP or BS) and a user terminal (STA or UE) autonomously obtain a transmission right in the BSS to perform communication. In a case where a plurality of antennas is mounted on a transmission terminal, transmission can be performed for a desired destination terminal with a high gain by using transmission (beamforming (BF)) using a plurality of the antennas simultaneously, and a system throughput in the BSS can be improved. In general, a gain obtained by beamforming is proportional to the number of antennas used at the same time. This beamforming can be extended to improve a system throughput by transmission by a plurality of APs (hereinafter, multi-AP) in cooperation with each other. There is a plurality of joint transmission schemes of the multiple-APs, but in these schemes, for example, coherent joint transmission (CJT), in which one virtual single AP with an antennas formed by combining the antennas performs transmission, can realize the highest gain.

In general, in order to implement beamforming, a weighting factor (hereinafter, a weight or a matrix of steering vectors) multiplied by a transmission antenna needs to be known in advance on the basis of channel state information between a transmission antenna of a transmission terminal and a reception antenna of a reception terminal. In order to achieve this, in IEEE 802.11, it is specified that a reference signal or information for the AP to estimate channel state information (CSI) is fed back to an AP that performs beamforming. A weight for performing the CJT (CJT weight) is calculated by a numerical calculation such as eigenvalue decomposition or a Gram-Schmidt orthonormalization method with respect to the CSI between the multi-AP and the user terminal. At this time, as a method of calculating the weight for performing the CJT on the basis of the fed back information, a method in which one AP (sharing AP or master AP) in charge of centralized control calculates a CJT weight is known (refer to, for example, Non-Patent Document 1).

CITATION LIST

Non-Patent Document

Non-Patent Document 1: Kosuke Aio, et al., "Consideration on Multi-AP Sounding", doc.: IEEE 802.11-19/1134r1 9 Aug. 2019

SUMMARY OF THE INVENTION

Problems to be Solved by the Invention

In the related art, notification of CSI between each AP and a terminal or information for estimating the CSI needs to be performed. Therefore, there is a problem that the overhead until the weight necessary for performing CJT is set in each AP is large, and an effective rate is lowered.

The present technology has been made in view of such a situation, and an object thereof is to efficiently generate a weight for performing joint transmission.

Solutions to Problems

The present technology has been made to solve the above-described problems, and according to a first aspect of the present technology, there is provided a wireless base station including: a wireless control unit that generates information regarding channel state information between a terminal which is a destination when performing joint transmission together with another wireless base station and a plurality of wireless base stations which is a transmission source of the joint transmission; and a communication unit that transmits the information regarding the channel state information to the another wireless base station. According to this, an effect is provided that the information regarding the channel state information is transmitted to the another wireless base station that performs the joint transmission.

Furthermore, in the first aspect, the wireless control unit may generate capability information regarding a communication scheme that is capable of being implemented by the wireless base station in the joint transmission and capability information regarding an algorithm that is capable of being performed by the wireless base station in weight calculation of the joint transmission, and the communication unit may transmit the capability information to the another wireless base station. According to this, an effect is provided that the capability information is transmitted to the another wireless base station that performs the joint transmission.

Furthermore, in the first aspect, the capability information may include at least one of a preset algorithm or an independently defined algorithm, as an algorithm that is capable of being performed in the weight calculation of the joint transmission. According to this, an effect is provided that the algorithm that can be performed in the weight calculation is transmitted to the another wireless base station that performs the joint transmission.

Furthermore, in the first aspect, the wireless control unit may generate use algorithm information regarding an algorithm used by the wireless base station in weight calculation of the joint transmission, and the communication unit may transmit the use algorithm information to the another wireless base station. According to this, an effect is provided that the use algorithm information is transmitted to the another wireless base station that performs the joint transmission.

Furthermore, in the first aspect, the use algorithm information may include at least one of information indicating an algorithm of weight calculation in a case where one terminal is set as a destination in the joint transmission, information indicating an algorithm of weight calculation in a case where a plurality of terminals is set as a destination in the joint transmission, or information indicating that a specific algorithm is used among independently defined algorithms. Furthermore, the use algorithm information may include any one of information regarding a complex phase of an eigenvector calculated in eigenvalue decomposition and information regarding operation order in a Gram-Schmidt orthonormalization method.

Furthermore, in the first aspect, the wireless control unit may generate weight synchronization information regarding a calculation result of a weight used by the wireless base station in the joint transmission, and the communication unit may transmit the weight synchronization information to the another wireless base station. According to this, an effect is provided that the weight synchronization information is transmitted to the another wireless base station that performs the joint transmission. In this case, the weight synchronization information may include quantization granularity, spatial stream order information, a power, and a complex phase.

Furthermore, in the first aspect, in a case where a request for the joint transmission is received from the terminal which is a destination of the joint transmission, the wireless control unit may generate information regarding channel state information between a specific terminal that transmits the request for the joint transmission and the plurality of wireless base stations that performs the joint transmission, and the communication unit may transmit the information regarding the channel state information with only the specific terminal to the another wireless base station. According to this, an effect is provided that the information regarding the channel state information with only the specific terminal which receives the request for the joint transmission is transmitted to the another wireless base station that performs the joint transmission.

Furthermore, according to a second aspect of the present technology, there is provided a wireless base station including: a communication unit that receives information necessary for performing joint transmission together with another wireless base station from the another wireless base station; and a wireless control unit that generates a weight of the joint transmission on the basis of information necessary for performing the joint transmission. According to this, an effect is provided that the weight of the joint transmission is generated on the basis of the information necessary for performing the joint transmission.

Furthermore, in the second aspect, the wireless control unit may generate capability information regarding a communication scheme that is capable of being implemented by the wireless base station in the joint transmission and capability information regarding an algorithm that is capable of being performed by the wireless base station in weight calculation of the joint transmission, and the communication unit may transmit the capability information to the another wireless base station. According to this, an effect is provided that the capability information is transmitted to the another wireless base station that performs the joint transmission.

Furthermore, in the second aspect, the communication unit may receive use algorithm information regarding an algorithm used by the another wireless base station in weight calculation of the joint transmission from the another wireless base station, and the wireless control unit may generate a weight of the joint transmission on the basis of the use algorithm information. According to this, an effect is provided that the weight of the joint transmission is generated on the basis of the use algorithm information received from the another wireless base station that performs the joint transmission. In this case, the use algorithm information may include any one of information regarding a complex phase of an eigenvector calculated in eigenvalue decomposition and information regarding operation order in a Gram-Schmidt orthonormalization method.

Furthermore, in the second aspect, the communication unit may receive weight synchronization information regarding a calculation result of a weight used by the another wireless base station in the joint transmission from the another wireless base station, and the wireless control unit may generate the weight of the joint transmission on the basis of the weight synchronization information. According to this, an effect is provided that the weight of the joint transmission is generated on the basis of the weight synchronization information.

Furthermore, in the second aspect, the wireless control unit may generate information regarding channel state information between a plurality of wireless base stations which is a transmission source of the joint transmission and the terminal which is a destination, in accordance with a request for information regarding the channel state information from the another wireless base station, and the communication unit may transmit the information regarding the channel state information to the another wireless base station. According to this, an effect is provided that the information regarding the channel state information is transmitted to the another wireless base station in accordance with the request from the another wireless base station that performs the joint transmission.

Furthermore, in the second aspect, in a case where a request for the joint transmission is received from the terminal which is a destination of the joint transmission, the wireless control unit may generate information regarding channel state information between a specific terminal that transmits the request for the joint transmission and the plurality of wireless base stations that performs the joint transmission, and the communication unit may transmit the information regarding the channel state information with only the specific terminal to the another wireless base station. According to this, an effect is provided that the information regarding the channel state information with only the specific terminal which receives the request for the joint transmission is transmitted to the another wireless base station that performs the joint transmission.

BRIEF DESCRIPTION OF DRAWINGS

FIG. 6 is a diagram illustrating a configuration example of a frame notification of which is performed in feedback information synchronization 841 and feedback information synchronization 842 according to an embodiment of the present technology.

FIG. 10 is a diagram illustrating a configuration example of a frame notification of which is performed in a feedback information synchronization request 843 according to an embodiment of the present technology.

MODE FOR CARRYING OUT THE INVENTION

Hereinafter, modes for carrying out the present technology (hereinafter, referred to as embodiments) will be described. A description will be given in the following order.
1. First Embodiment
2. Second Embodiment
3. Third Embodiment
4. Fourth Embodiment
5. Fifth Embodiment 1. First Embodiment

[Wireless Network System]

Figure 1:
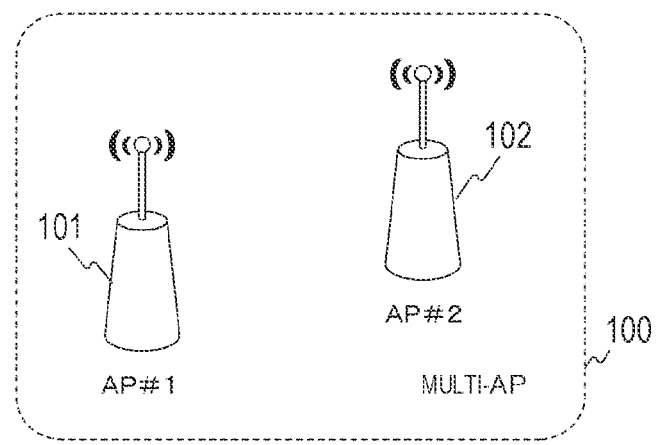
FIG. 1 is a diagram illustrating a configuration example of a wireless network system according to an embodiment of the present technology.
Figure 1:
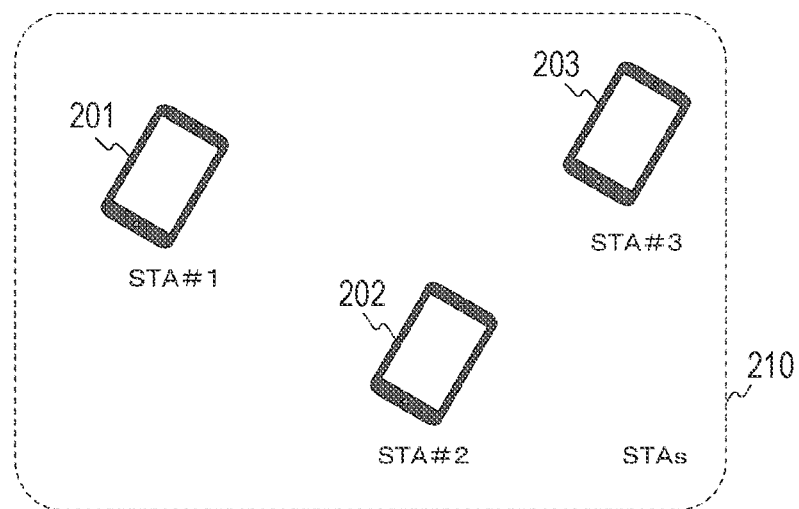

FIG. 1 is a diagram illustrating a configuration example of a wireless network system according to the embodiment of the present technology.

In this wireless network system, a plurality of access points AP #1 (101) and AP #2 (102) and a plurality of communication terminals STA #1 (201), STA #2 (202), and STA #3 (203) are connected to each other. Then, the access points AP #1 (101) and AP #2 (102), as a multi-AP 100, are configured to perform joint transmission for a communication terminal group 210 including a plurality of arbitrary communication terminals.

In the APs configuring a multi-AP 100, the AP, which acquires a transmission right in advance prior to execution of the joint transmission, is referred to as a sharing AP, and the AP, which does not acquire the transmission right, is referred to as a shared AP. The APs may have the following roles. In other words, in a case where the sharing AP performs, as the multi-AP, a joint operation with the shared AP, after acquiring the transmission right, the sharing AP notifies the shared AP that the sharing AP performs the joint operation within the transmission time acquired by the sharing AP itself. Note that the sharing AP may be referred to as a master AP, and the shared AP may be referred to as a slave AP.

Furthermore, the sharing AP and the shared AP are not fixedly determined for the AP, and may be dynamically determined in the multi-AP. For example, the AP that has notified another AP of a request for performing a joint operation may acquire a right to operate as the sharing AP, or may be determined by a magnitude relationship among values of MAC addresses of a plurality of the APs or a user who uses an application for controlling the multi-APs. Furthermore, for example, at a certain time t1, an AP 1 may be the sharing AP and an AP 2 may be the shared AP, and at a different time t2, the AP 1 may be the shared AP and the AP 2 may be the sharing AP.

Note that frequency channels used by the multi-AP for transmission to the communication terminals may completely coincide with each other, or may partially coincide with each other. Furthermore, an example in which one shared AP and three communication terminals are provided is illustrated in the drawing, but the number of shared APs and the number of communication terminals may be any number. For example, there may be two shared APs and one communication terminal.

In such a configuration, according to the following embodiment, by calculating a weight for each of the APs configuring the multi-AP to perform the joint transmission, the generation efficiency of the weight for performing the joint transmission is improved without the processing of the APs performing notification to each other. However, in a case where each of the APs calculates the weight for performing the joint transmission as in the present embodiment, there is a possibility that the weights are different between the APs and it becomes difficult to appropriately perform the joint transmission, as will be giving an example of a specific algorithm below.

[Eigenvalue Decomposition]

In the eigenvalue decomposition, an eigenvector u satisfying the following formula is calculated for a square matrix A.

$$Au=\lambda u \quad s.t. \|u\|=1$$

where $\|u\|$ represents a norm of the vector u, and $\lambda$ represents an arbitrary complex number. In particular, $\lambda$ is referred to as an eigenvalue. Even when the magnitude (that is, $|\lambda|$) of the eigenvalue is the same, the complex phase is different, and thus a complex phase of each element of u is also different.

When other CSI estimated by each of the APs on the basis of the information fed back from the terminal is set to A, a vector obtained by multiplying the eigenvector u obtained by the eigenvalue decomposition by a constant can be used as a weight vector of the CJT applied to the entire multi-AP (hereinafter, "multi-AP-CJT weight"). Each of the APs applies some rows of the calculated multi-AP-CJT weight as its own weight. However, since the complex phases of the eigenvalues do not coincide with each other between the APs that calculates u, each of the APs calculates different u. Therefore, the multi-AP-CJT weight assumed by the each of the APs is different, and there is a possibility that an appropriate CJT weight is not applied to the entire multi-AP as it is. Although the case where the eigenvector is directly used as the CJT weight has been described here, the same applies to the CJT weight calculated by a minimize maximum square error (MMSE) method.

[Gram-Schmidt Orthonormalization Method]

The Gram-Schmidt orthonormalization method is a method of orthogonalizing a plurality of vectors to each other, and can be used particularly in a case where a plurality of streams is transmitted. Specifically, a reference vector ($a_k$) is selected from a plurality of vectors $a_1, a_2, \ldots,$ and $a_N$, and a correlation component with the reference vector $a_k$ is subtracted from a different arbitrary vector ($a_l$). Subsequently, a correlation component with $a_k$ and $a_l$ is further subtracted from a different vector ($a_m$, m≠k, l), and thereafter, a similar calculation is performed. Therefore, obtained vectors $b_1, b_2, \ldots, b_N$ are orthogonalized to each other. At this time, the generated vectors orthogonalized to each other have different properties depending on the order of the reference vector and the vectors selected thereafter.

The vectors obtained by multiplying the eigenvectors for A fed back from the terminal by arbitrary constants with respect to the vectors $b_1, b_2, \ldots,$ and $b_N$ obtained by the Gram-Schmidt orthonormalization method on the basis of $a_1, a_2, \ldots,$ and $a_N$ can be used as weights in the CJT. However, in a case where weights for performing simultaneous communication to a plurality of users are calculated by each of the APs in the CJT, it is not guaranteed that the order of the reference vector and the order of a vector selected thereafter coincides with each other as described above, and thus, there is a possibility that a desired weight is not applied to the entire multi-AP as in the case of the eigenvalue decomposition described above.

Therefore, in the following embodiment, in a case where each of the APs configuring the multi-AP calculates a CJT weight, an information notification regarding a parameter necessary for matching the multi-AP-CJT weights calculated by the APs is performed between the APs, and an operation (hereinafter, weight synchronization) for matching the weights of the multi-AP-CJT calculated between the APs is performed. As a result, in a case where each AP calculates the CJT weight, even in a case where details of an algorithm that can be applied to the calculation of the multi-AP-weight is different in each AP, it is possible to accurately calculate the weight with which the CJT can be performed, and in addition to this, it is possible to perform the CJT with a small overhead as compared with the method of the related art.

Furthermore, since each AP calculates the CJT weight, each of the APs configuring the multi-AP simultaneously transmits, to the terminal, a reference signal for the terminal to estimate CSI, and notifies (hereinafter, explicitly feeds back) each AP of the estimation result. Then, an information notification (feedback information synchronization) for confirming that the estimation results notification of which is performed coincide with each other between the APs is performed. Then, in addition to this, notification of information regarding whether or not to perform a calculation algorithm for the multi-AP-CJT weight in each AP, such as eigenvalue decomposition, a Gram-Schmidt orthonormalization method, and numerical operations independently specified by AP vendors, is performed between the APs, and an algorithm used at the time of calculating the multi-AP-CJT weight is synchronized between the APs. According to this, the amount of information necessary for weight synchronization in each AP is reduced.

[Device Configuration]

Figure 2:
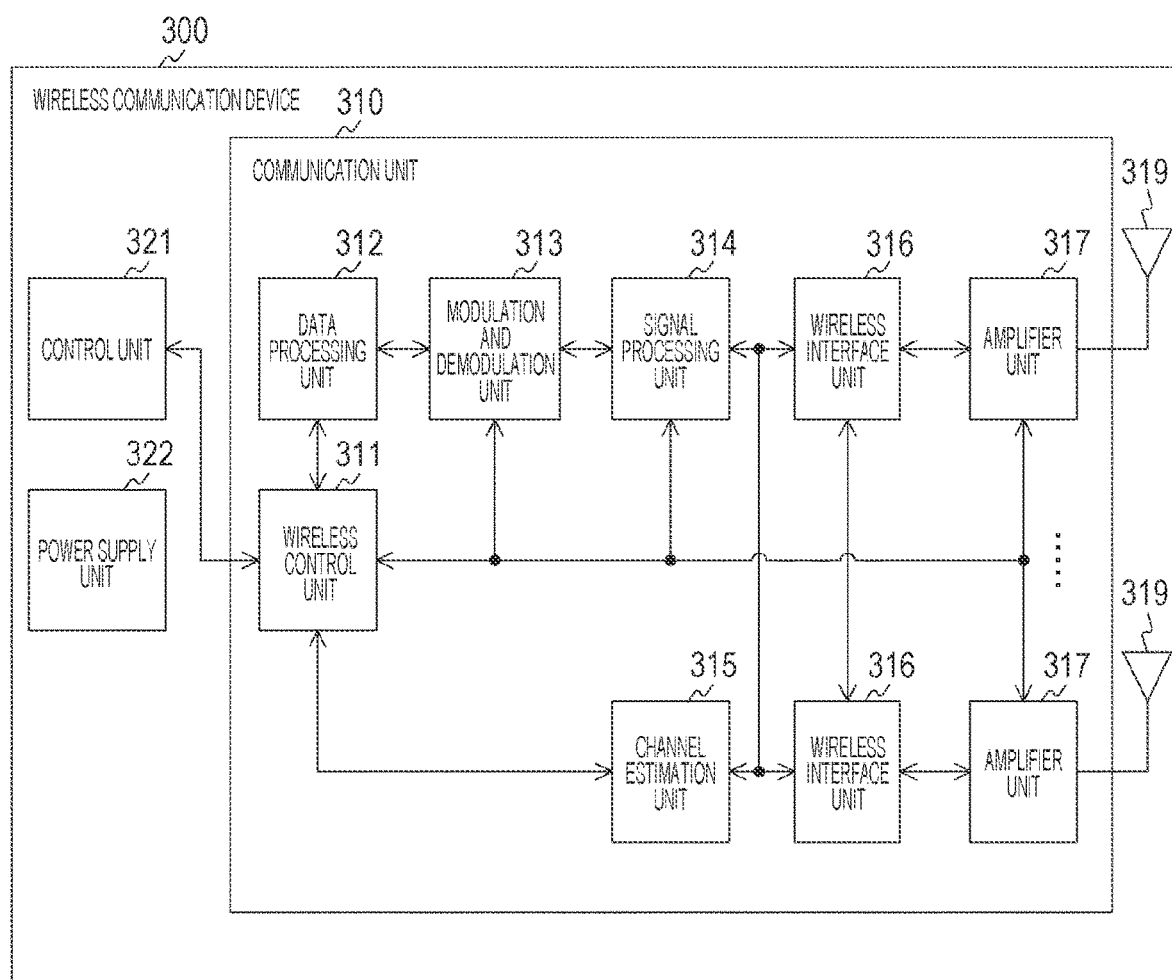
FIG. 2 is a diagram illustrating a configuration example of a wireless communication device 300 according to an embodiment of the present technology.

FIG. 2 is a diagram illustrating a configuration example of a wireless communication device 300 according to the embodiment of the present technology. The wireless communication device 300 described herein includes the access points AP #1 (101) and AP #2 (102) described above and the communication terminals STA #1 (201) to STA #3 (203). For example, the wireless communication device 300 may be a wireless communication module or an integrated circuit, which is mounted on the AP or the terminal.

The wireless communication device 300 includes a communication unit 310, a control unit 321, a power supply unit 322, and an antenna 319. There may be provided a plurality of communication units 310.

The communication unit 310 includes a wireless control unit 311, a data processing unit 312, a modulation and demodulation unit 313, a signal processing unit 314, a channel estimation unit 315, a wireless interface unit 316, and an amplifier unit 317. The wireless interface unit 316, the amplifier unit 317, and the antenna 319 may be formed as one set, and one or more sets may be a component. Furthermore, a function of the amplifier unit 317 may be included in the wireless interface unit 316. The communication unit 310 is realized by, for example, a large scale integration (LSI).

At the time of transmission in which data is input from the higher layer, the data processing unit 312 generates a packet for wireless transmission from the data, performs processing such as addition of a header for media access control (MAC) or addition of an error detection code, and supplies the processed data to the modulation and demodulation unit 313. On the other hand, at the time of reception in which there is an input from the modulation and demodulation unit 313, MAC header analysis, packet error detection, reorder processing, and the like are performed, and the processed data is provided to the higher layer of its own protocol.

The wireless control unit 311 exchanges information between the units. Furthermore, parameter setting in the modulation and demodulation unit 313 and the signal processing unit 314, packet scheduling in the data processing unit 312, parameter setting and transmission power control of the modulation and demodulation unit 313, the signal processing unit 314, the wireless interface unit 316, and the amplifier unit 317 are performed.

At the time of transmission, the modulation and demodulation unit 313 encodes, interleaves, and modulates the input data from the data processing unit 312 on the basis of the encoding scheme and modulation scheme set by the wireless control unit 311, generates a data symbol stream, and supplies the data symbol stream to the signal processing unit 314. At the time of reception, processing reverse to that at the time of transmission is performed on the input from the signal processing unit 314, and data is supplied to the data processing unit 312 or the wireless control unit 311.

At the time of transmission, the signal processing unit 314 performs signal processing for spatial separation on the input from the modulation and demodulation unit 313 as necessary, and supplies the obtained one or more transmission symbol streams to each wireless interface unit 316. Note that transmission (hereinafter, cyclic shift delay (CSD)) may be applied by assigning an arbitrary delay amount to each antenna 319 without performing the spatial separation. Furthermore, at the time of reception, the signal processing unit 314 performs signal processing on the received symbol stream input from each wireless interface unit 316, performs spatial decomposition of the stream as necessary, and supplies the result to the modulation and demodulation unit 313.

The channel estimation unit 315 calculates complex channel gain information of the channel from a preamble portion and a training signal portion of the input signals from the wireless interface units 316. The calculated complex channel gain information is used for demodulation processing in the modulation and demodulation unit 313 and spatial processing in the signal processing unit 314 via the wireless control unit 311.

At the time of transmission, the wireless interface unit 316 converts the input from the signal processing unit 314 into an analog signal, performs filtering, up-conversion to a carrier frequency, and phase control, and transmits the analog signal to the antenna 319 or the amplifier unit 317. At the time of reception, reverse processing is performed on the input from the antenna 319 or the amplifier unit 317, and data is supplied to the signal processing unit 314 and the channel estimation unit 315.

At the time of transmission, the amplifier unit 317 amplifies the analog signal input from the wireless interface unit 316 to predetermined power, and transmits the amplified analog signal to the antenna 319. At the time of reception, a signal input from the antenna 319 is amplified to predetermined power and output the signal to the wireless interface unit 316. All or a part of the amplifier unit 317 in at least one of a function at the time of transmission or a function at the time of reception may be included in the wireless interface unit 316. Furthermore, all or a part of the amplifier unit 317 in at least one of the function at the time of transmission or the function at the time of reception may be a component outside the communication unit 310.

The control unit 321 controls the wireless control unit 311 and the power supply unit 322. Furthermore, the control unit 321 may perform at least a part of the operation of the wireless control unit 311 instead of the wireless control unit 311.

The power supply unit 322 includes a battery power supply or a fixed power supply, and supplies power to each unit of the wireless communication device 300.

In this configuration, the wireless control unit 311 and the control unit 321 control each unit to perform the following operations.

[Operation]

Figure 3:
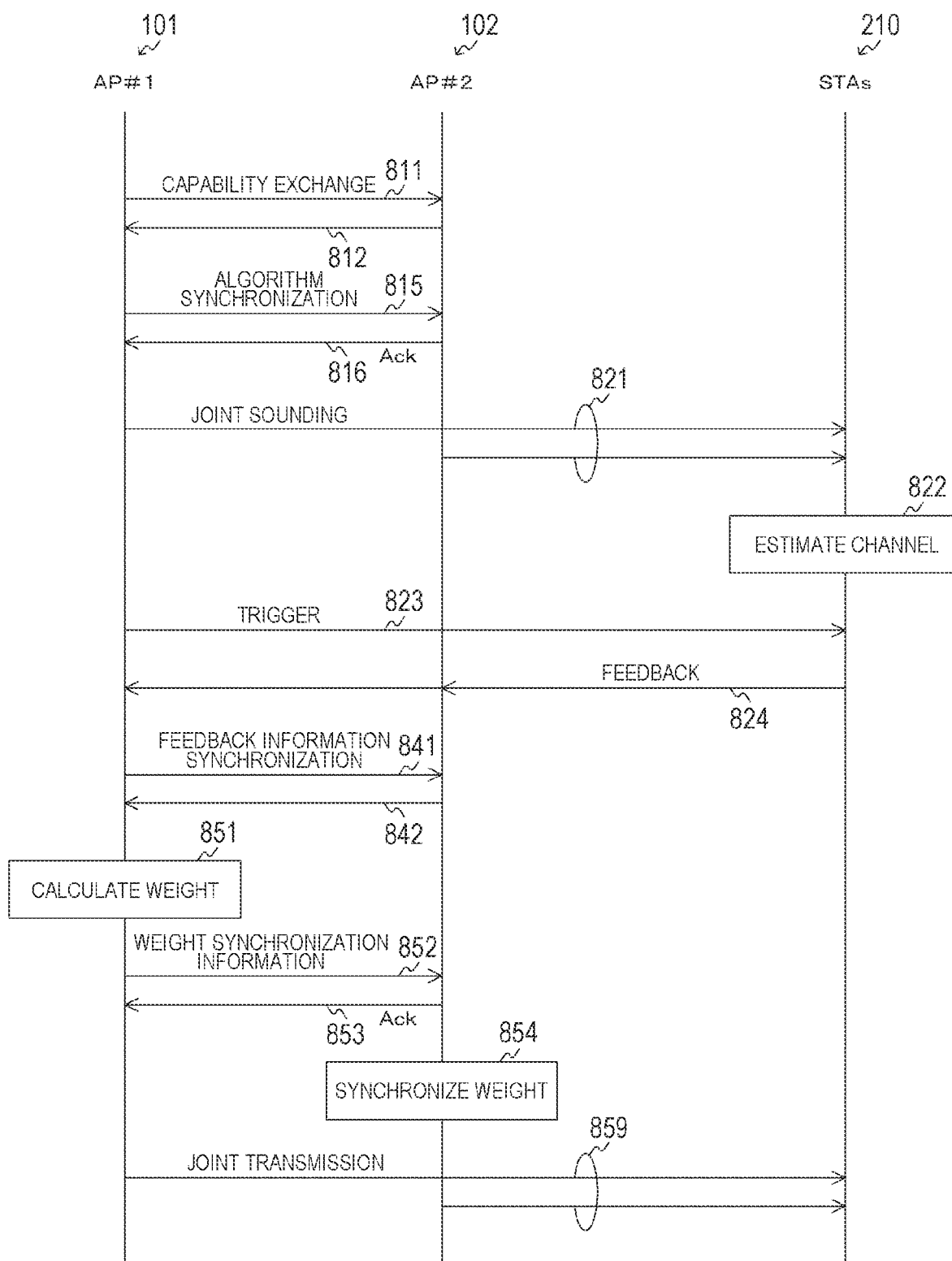
FIG. 3 is a sequence diagram illustrating an operation example of a wireless network system according to a first embodiment of the present technology.

FIG. 3 is a sequence diagram illustrating an operation example of a wireless network system according to a first embodiment of the present technology.

Here, there is a plurality of communication terminals STAs, one sharing AP and one shared AP. Although this example indicates a case where capability exchange and feedback information synchronization are performed earlier than AP #1, some or all of these may be performed earlier than AP #2. Furthermore, similarly, this example indicates a case where algorithm synchronization, weight synchronization information, and weight calculation are performed by the AP #1, but some or all of these may be performed by the AP #2. Furthermore, for example, in performing the feedback information synchronization to be described later, the feedback information synchronization may be performed by the AP that has acquired the transmission right earlier.

Furthermore, each sequence may be implemented as one sequence formed by collecting some of the sequences or the sequences may be partially omitted as necessary. For example, notification of information notification of which is performed in the capability exchange and algorithm synchronization may be collectively performed as one frame.

[Capability Exchange]

First, the AP #1 and the AP #2 perform notification of information regarding the capability of the AP #1 and the AP #2 to each other. This is referred to as capability exchange 811 and capability exchange 812. The capability herein refers to whether or not joint sounding or joint transmission to be described later is performed or the type of algorithm that can be used at the time of the weight calculation, but is not limited thereto.

Whether or not the algorithm for weight calculation is performed may vary depending on the device. Therefore, notification of an algorithm implemented among generally known algorithms such as eigenvalue decomposition and a Gram-Schmidt orthonormalization method may be performed in the capability exchange 811 and capability exchange 812. Furthermore, instead of the generally known algorithm as described above, notification of an algorithm independently implemented by a vendor may be performed.

The capability exchange 811 and capability exchange 812 may be performed by being included in, for example, a beacon signal periodically transmitted by each AP or an information notification (association) for connection for the APs to operate as a multi-AP.

Figure 4:
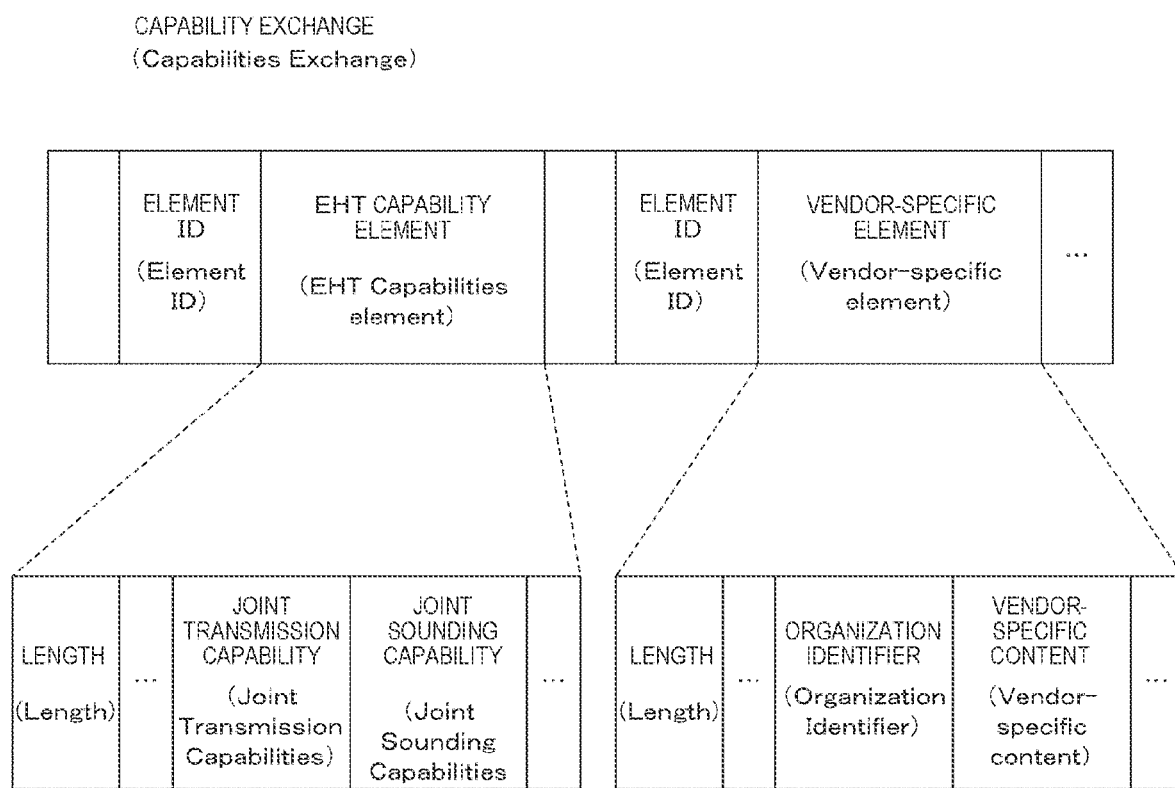
FIG. 4 is a diagram illustrating a configuration example of a frame notification of which is performed in capability exchange 811 and capability exchange 812 according to an embodiment of the present technology.

FIG. 4 is a diagram illustrating a configuration example of a frame notification of which is performed in capability exchange 811 and capability exchange 812 according to the embodiment of the present technology.

The notification frame of the capability exchange 811 and capability exchange 812 is configured by an "element ID", an "Extremely High Throughput (EHT) capability element", and a "vendor-specific element", but the components are not limited thereto. Note that the order of the "EHT capability element" and the "vendor-specific element" may not be as described above.

The "Element ID" includes information indicating the type of immediately subsequent element. The "EHT capability element" includes information indicating whether or not the CJT can be performed and whether or not joint sounding to be described later can be performed. The "vendor-specific element" includes information indicating a manufacturing vendor of the device and information regarding a vendor-specific numerical calculation algorithm.

The "element ID" is information necessary for identifying an immediately subsequent element at the time of reception, and includes information capable of uniquely indicating the type of immediately subsequent element. Note that identification may be performed using arbitrary information included in the subsequent element.

The "EHT capability element" includes at least one of the fields of a "length", "joint transmission capability", and "joint sounding capability". The "length" includes information indicating a bit length of the "EHT capability element". The "joint transmission capability" includes information indicating whether or not CJT can be performed for a device that transmits a main frame. The "joint sounding capability" includes information indicating whether or not joint sounding can be performed for the device that transmits a main frame.

The "vendor-specific element" includes at least one of fields of a "length", an "organization identifier", and a "vendor-specific content". The "length" includes information indicating a bit length of the "vendor-specific element". The "organization identifier" includes information indicating a vendor of the device that transmits a main frame. The "vendor-specific content" includes information regarding a vendor-specific numerical calculation algorithm for the device that transmits a main frame.

[Algorithm Synchronization]

Next, the AP performs an information notification for determining an algorithm to be used when performing the CJT. This is referred to as algorithm synchronization 815. In the algorithm synchronization 815, on the basis of information notification of which is performed in the capability exchange 811 and capability exchange 812, notification of information indicating an algorithm commonly used by both the APs in the weight calculation of the CJT is performed.

At this time, as illustrated in the drawing, the AP #1 performs the algorithm synchronization 815 for the AP #2, and thus an algorithm used for calculating the weight of the CJT is designated. Then, an acknowledgement Ack 816 in response to this is performed, and thus the algorithm notification of which is performed in the algorithm synchronization 815 may be used in the weight calculation of the CJT.

Furthermore, in the algorithm synchronization 815, the AP #1 may perform notification of information indicating a candidate of an algorithm to be used for calculating the weight of the CJT, and perform notification of information indicating an algorithm to be performed for this by the AP #2. Note that, in this case, since notification of the algorithm that can be performed between the APs is performed to each other, when it is determined that a transmission source terminal can perform the joint sounding and joint transmission when the algorithm synchronization 815 is performed, the capability exchange 811 and capability exchange 812 do not need to be performed in advance.

Note that, in this example, the algorithm synchronization 815 is started from the AP #1, but may be started from the AP #2.

Figure 5:
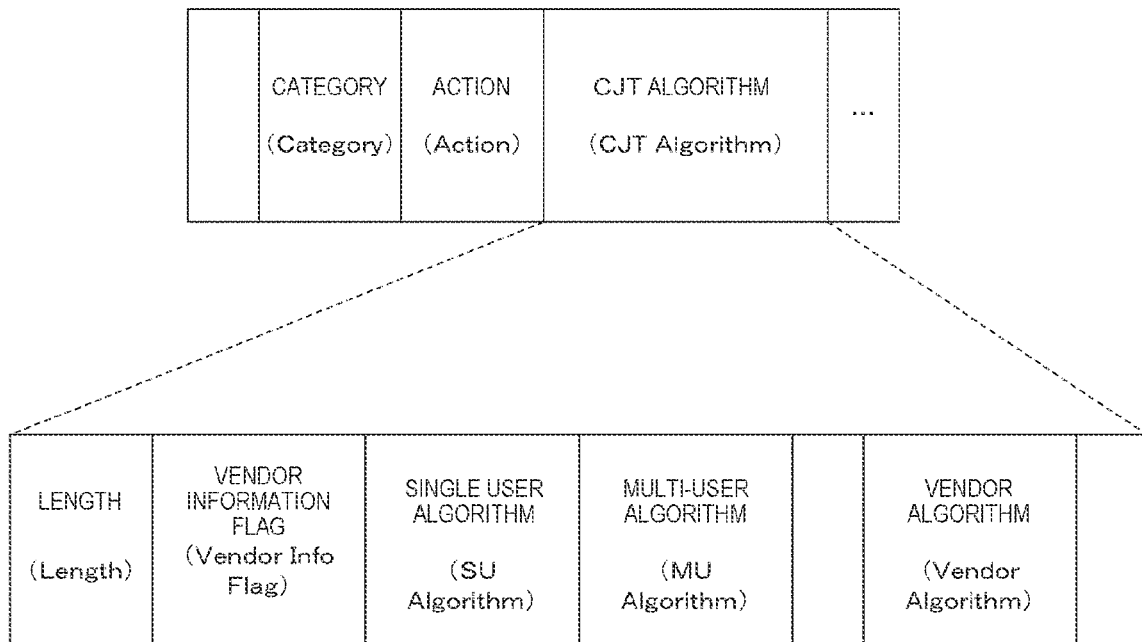
FIG. 5 is a diagram illustrating a configuration example of a frame notification of which is performed in algorithm synchronization 815 according to an embodiment of the present technology.

FIG. 5 is a diagram illustrating a configuration example of a frame notification of which is performed in the algorithm synchronization 815 according to the embodiment of the present technology.

A notification frame of this algorithm synchronization 815 includes a "category", an "action", and a "CJT algorithm", but components are not limited to these. The "category" and the "action" include information indicating that the subsequent "CJT algorithm" exists by combining the information included in both the category and the action. The "CJT algorithm" includes information regarding an algorithm in weight calculation of the CJT.

The "category" includes information indicating that subsequent information is the "CJT algorithm".

The "action" may include information indicating from where notification of a main frame is performed among the algorithm synchronization 815, feedback information synchronization 841 to be described later, and weight synchronization 854. Specifically, in particular, the "action" may store information as below. That is, "00" indicates that the main frame is sent in the algorithm synchronization 815, "01" indicates that the main frame is sent in the feedback information synchronization 841, and "10" indicates that the main frame is sent in the weight synchronization 854.

The "CJT algorithm" includes one or more subfields of a "length", a "vendor information flag", a "single user algorithm", a "multi-user algorithm", and a "vendor algorithm".

The "length" includes information indicating a bit length of the "CJT algorithm". The "vendor information flag" includes information indicating that the "vendor algorithm" is included in the "CJT algorithm". The "single user algorithm" (SU algorithm) includes information regarding an algorithm in the weight calculation when the transmission is performed only to one terminal in the CJT. The "multi-user algorithm" (MU algorithm) includes information regarding an algorithm in the weight calculation when the transmission is performed to a plurality of the terminals in the CJT. The "vendor algorithm" includes information regarding an algorithm determined by a specific vendor in the weight calculation at the time of performing the CJT.

As a specific example, information may be stored in these subfields as below.

For example, the "vendor information flag" shows "one" when the "vendor algorithm" is included in the "CJT algorithm", but otherwise, the "vendor information flag" shows "zero".

Furthermore, for example, in the "single user algorithm", when the multi-AP-CJT weight when transmission is performed only to one terminal in the CJT is "00", it is indicated that a unit matrix is applied; when the multi-AP-CJT weight when transmission is performed only to one terminal in the CJT is "01", it is indicated that a discrete Fourier transformation (DFT) matrix is applied; and when the multi-AP-CJT weight when transmission is performed only to one terminal in the CJT is "10", it is indicated that a singular vector obtained by singular value decomposition (SVD) or an eigenvector obtained by eigenvalue decomposition (EVD) is applied to a propagation channel matrix H between the multi-AP and the terminal.

Furthermore, for example, in the "multi-user algorithm", when the multi-AP-CJT weight when transmission is performed to a plurality of the terminals in the CJT is "00", it is indicated that a vector obtained with zero forcing (ZF) criteria is applied; when the multi-AP-CJT weight when transmission is performed to a plurality of the terminals in the CJT is "01", a vector obtained by minimize maximum square error (MMSE) criteria is applied; and when the multi-AP-CJT weight when transmission is performed to a plurality of the terminals in the CJT is "10", a vector obtained by a Gram-Schmidt orthonormalization method is applied.

Note that the DFT matrix is represented by the following Formula 1.

[Mathematical formula 1]

$$Q = \begin{bmatrix} W_0^0 & W_0^1 & \cdots & W_0^{N_{DFT}-1} \\ W_1^0 & W_1^1 & \cdots & W_1^{N_{DFT}-1} \\ \vdots & \vdots & \ddots & \vdots \\ W_{N_{DFT}-1}^0 & W_{N_{DFT}-1}^1 & \cdots & W_{N_{DFT}-1}^{N_{DFT}-1} \end{bmatrix}, \quad \text{Formula 1}$$

$$\text{s.t. } W_a^b = e^{-j2\pi \frac{a}{N_{DFT}} b}, N_{DFT} \in Z^+$$

where $Z^+$ represents a set of all positive integers.

Furthermore, $w^{(f_l)}$ represented in the following Formula 2 indicates an example of a vector of MMSE criteria applied to a frequency $f_l$ at the time of transmission to a certain desired terminal $STA_k$.

[Mathematical formula 2]

$$w^{(f_l)} \propto \max.\text{eigenvector}\{(\sigma_N^2 I + \widetilde{H}^{(f_l)H} \widetilde{H}^{(f_l)})^{-1}(h_k^{(f_l)} h_k^{(f_l)})\} \quad \text{Formula 2}$$

where
- $H^{(f_l)}$ indicates a propagation channel matrix at a frequency $f_l$ between the multi-AP and the terminal;
- $h_k^{(f_l)}$ indicates a channel matrix between the multi-AP and the terminal $STA_k$ in $H^{(f_l)}$;
- $\widetilde{H}^{(f_l)}$ indicates a matrix obtained by removing $hk^{(f_l)}$ in $H^{(f_l)}$;
- I indicates a unit matrix;
- $\sigma_N^2$ indicates an average value of noise power between all the antennas that can be measured in the terminal $STA_k$;
- $A^H$ indicates a complex conjugate transpose matrix of a matrix A; and max.eigenvector {A} indicates an eigenvector having the maximum eigenvalue among eigenvectors of a matrix A.

Note that the vector of the ZF criteria is, for example, represented by the following Formula 3, similarly to the vector of the MMSE criteria.

[Mathematical formula 3]

$$w^{(f_l)} \propto \text{max.eigenvector}\{(\tilde{H}^{(f_l)H}\tilde{H}^{(f_l)})^{-1}(h_k^{(f_l)H}h_k^{(f_l)})\} \quad \text{Formula 3}$$

Furthermore, $w^{(f_l)}$ represented by the following Formula 5 is an example of a vector in a Gram-Schmidt orthonormalization method.

Here, $h_k^{(f_l)}$ indicates a channel matrix at a frequency $f_l$ between the multi-AP and the terminal $STA_k$, $H^{(f_l)}=[(h_1^{(f_l)})^T, (h_2^{(f_l)})^T, \ldots, (h_N^{(f_l)})^T]^T$ indicates a propagation matrix, and $[a_1, a_2, \ldots, a_N]$ indicates an integer sequence obtained by rearranging a consecutive integer sequence from one to N in arbitrary order.

At this time, arbitrary $h_{am}^{(f_l)}$ is converted into matrices $h\tilde{}_{am}^{(f_l)}$ orthogonalized to each other by the following Formula 4.

[Mathematical formula 4]

$$w \propto \tilde{h}_{a_m}^{(f_l)} \text{ s.t. } \tilde{h}_{a_m}^{(f_l)} = \left[\frac{\tilde{h}_{a_m}^{(f_l,1)}}{\|\tilde{h}_{a_m}^{(f_l,1)}\|} \cdots \frac{\tilde{h}_{a_m}^{(f_l,N_m)}}{\|\tilde{h}_{a_m}^{(f_l,N_m)}\|}\right], \quad \text{Formula 4}$$

$$\tilde{h}_{a_m}^{(f_1,j)} = \tilde{h}_{a_m}^{(f_1,j)} - \sum_{l=1}^{m-1}\sum_{p=1}^{N_1} \tilde{h}_{a_l}^{(f_1,p)H} h_{a_m}^{(f_1,j)} \tilde{h}_{a_l}^{(f_1,p)}$$

where j indicates an arbitrary integer from one to $N_m$; $a^{(fl, c)}$ and $b^{-(fl, c)}$ respectively indicates the c-th column vectors of $a^{(fl)}$ and $b^{-(fl)}$ with respect to a matrix represented by $a^{(fl)}$ or $b^{-(fl)}$; and $N_m$ indicates the number of columns of $h_{am}^{(fl)}$ or $h^-{}_{am}^{(fl)}$.

[Joint Sounding]

In order to calculate the weight of the CJT, the AP #1 and the AP #2 transmit a reference signal for the terminal to estimate channel state information, that is, perform joint sounding 821.

In the joint sounding 821, reference signals orthogonal to each other in a frequency domain may be transmitted by the AP #1 and the AP #2, but the reference signals need to be transmitted so as to obtain channel state information with each transmission antenna that transmits the joint sounding 821 and a correlation between a transmission antenna and a reception antenna.

Note that notification of the reference signal for performing frequency synchronization and time synchronization between the APs may be performed for the AP #1 and the AP #2 immediately before the joint sounding 821 is performed.

The joint sounding 821 is performed, and a terminal serving as a desired destination terminal performs estimation 822 of channel state information on the basis of the received reference signal.

[Trigger and Feedback]

The terminal for which the joint sounding 821 is performed performs feedback 824 which is a notification of information regarding the estimated channel to the AP #1 and the AP #2. The feedback 824 may be performed for each terminal in a time-division manner, or may be performed by a plurality of the terminals simultaneously in a frequency-division manner.

In this example, immediately before the feedback 824, it is indicated that trigger 823, which is an information notification that the terminal induces the feedback to be performed, is performed, but it does not necessarily need to be performed.

However, in a case where the feedback 824 is performed by frequency multiplexing of a plurality of the terminals, such as orthogonal frequency division multiple access (OFDMA) as defined in IEEE 802.11, a notification regarding the feedback 824 of the terminal may be performed as the trigger 823 immediately before the feedback 824.

[Feedback Information Synchronization and Weight Calculation]

The multi-AP, for which the feedback 824 is performed by the terminal, performs information notification regarding feedback information synchronization 841 and feedback information synchronization 842 in order to confirm whether there is a difference in information regarding the channel, notification of which is performed in the feedback 824.

As in this example, when the AP #1 performs the feedback information synchronization 841 for the AP #2, the AP #2 is notified of information regarding the channel held by the AP #1. Thereafter, the AP #2 notifies the AP #1 of information indicating a difference between the information regarding the channel held by the AP #1 notification of which is performed and the information regarding the channel held by the AP #2 itself in the feedback information synchronization 842.

As in this example, the AP #1, for which the feedback information synchronization 842 is performed by the AP #2, performs weight calculation 851 of the multi-AP-CJT for the channel state information commonly held by the multiple APs. The weight calculation 851 may be performed on the basis of the methods shown in Formulas 2 to 4 described above, but is not limited thereto.

Here, for example, in a case where notification of the feedback 824 from a certain terminal is performed to the AP #1 but cannot be received by the AP #2, the channel state information held by the multi-APs does not coincide with each other. In the weight calculation of the multi-AP-CJT, a weight for an arbitrary terminal is required so as not to interfere with other terminals at the time of transmission. Therefore, when the information regarding the channel held by each AP does not coincide with each other, the weight calculated by each AP is different. The feedback information synchronization 841 and feedback information synchronization 842 are performed to avoid this.

Furthermore, for example, in a case where notification of information indicating a singular vector of a channel matrix is performed to the channel with the multi-AP in the feedback 824 from each terminal, each AP manages the singular vectors in order by using a matrix or the like, but this order may be different between the APs. In the weight calculation of the multi-AP-CJT, the eigenvalue decomposition, or the Gram-Schmidt orthonormalization method is performed for an ordered singular vector group (hereinafter, a singular matrix), but in a case where the singular matrix is different between the APs, the weight calculated in each AP is different. The feedback information synchronization 841 and feedback information synchronization 842 are performed to avoid this.

Note that, in this example, the feedback information synchronization 841 is started from the AP #1, but may be started from the AP #2.

FIG. 6 is a diagram illustrating a configuration example of a frame notified in the feedback information synchronization 841 and the feedback information synchronization 842 according to the embodiment of the present technology.

Notification frames of the feedback information synchronization 841 and the feedback information synchronization 842 include a "category", an "action", and "feedback information", but components are not limited to these.

The "category" and the "action" are similar to those in the algorithm synchronization 815 described above.

The "feedback information" includes information regarding channel state information between the AP performing notification of the main frame and the terminal. The "feedback information" includes at least one of subfields of a "direction", a "weight synchronization flag", the "number of terminals", and "terminal information".

The "direction" includes information indicating whether or not feedback information synchronization has been performed precedingly.

The "weight synchronization flag" includes information indicating whether or not weight synchronization can be performed according to the information included in the "direction", or information indicating whether or not there is subsequent information in the "feedback information".

The "number of terminals" (STA number) includes information indicating the number of subsequent "terminal information" subfields.

The "terminal information" (STA Information #1 to #$N_{STA}$) includes information regarding a channel between a certain terminal and the multi-AP, the information held by the AP that transmits the main frame according to information included in the "direction", or information regarding a difference from the channel state information notification of which is performed in the preceding feedback information synchronization. Note that the "terminal information" includes at least one of an association identifier (AID) or an SS number. The AID includes information uniquely indicating the terminal indicated in the "terminal information" subfield. Furthermore, the SS number includes information indicating a spatial stream (SS) of the channel state information.

As a specific example, information may be stored in the "feedback information" as below. Note that a case where the AP #1 performs the "feedback information synchronization" for the AP #2, and immediately thereafter, the AP #2 performs the "feedback information synchronization" for the AP #1 will be described below. However, the same applies to a case where the AP #1 and the AP #2 are switched.

When the AP #1 performs the feedback information synchronization 841 for the AP #2, "direction"="one" is set in the "feedback information" notification of which is performed. At this time, in a case where it is requested that the AP #1 performs the weight synchronization 854, "weight synchronization flag"="one" is set, and otherwise, "weight synchronization flag"="zero" is set. Furthermore, when "weight synchronization flag"="zero" is set, the "number of terminals" and the "terminal information" do not exist subsequently, but in a case where "weight synchronization flag"="one" is set, the "number of terminals" and the "terminal information" exist subsequently.

In the "terminal information", the "AID" of each terminal included in the channel state information between the multi-AP and the terminal, which is obtained by the AP #1 in the joint sounding is stored. However, the "AID" indicated in each "terminal information" is different from each other.

On the other hand, the AP #2 for which the AP #1 has performed the feedback information synchronization 841 with "direction"="one" notifies the AP #1 of the feedback information synchronization 842 with "direction"="zero".

At this time, in a case where the AP #1 performs, for the AP #2, the feedback information synchronization 841 with "direction"="one" and "weight synchronization flag"="one" precedingly, when there is a terminal that is not included in the channel state information between the multi-AP and the terminal, which is held by the AP #2 itself, among the "AIDs" indicated by the "terminal information" in the feedback information synchronization 841, the AP #2 sets "weight synchronization flag"="one", stores an "AID" of the terminal in each "terminal information", and stores the number of the corresponding terminals in the "number of terminals". In other cases, the main frame with "weight synchronization flag"="zero" is transmitted, but the "number of terminals" and the "terminal information" should not exist.

In a case where the AP #2 performs the feedback information synchronization 842 with "direction"="zero" for the AP #1, and when "weight synchronization flag"="zero" in the frame notification of which is performed is set, the AP #1, which has performed, for the AP #2, the feedback information synchronization 841 with "direction"="one", performs the weight calculation 851 of the multi-AP-CJT by using the channel state information between the multi-AP and the terminal, which is held by the AP #1 itself. On the other hand, in a case where "weight synchronization flag"="one" is set, the channel state information of the terminal having the "AID" notification of which is performed in the "terminal information" may not be used when the weight calculation of the multi-AP-CJT is performed. Furthermore, notification of the channel state information between the terminal indicated by the "AID" and the multi-AP may be performed to the AP #2.

[Weight Synchronization Information and Weight Synchronization]

The AP, which has performed the weight calculation 851, notifies the other APs configuring the multi-AP of weight synchronization information 852 regarding the weight calculated by the AP itself.

This example shows a case where the AP #1 performs the weight synchronization information 852 for the AP #2, and the AP #2 needs to calculate the CJT weight on the basis of the channel state information held by the AP #2 itself after the weight synchronization information 852 is performed. However, as described above, in the multi-AP-CJT weight, the calculation result of the AP #1 and the calculation result of the AP #2 are in a relationship multiplied by a complex constant. Therefore, the AP #2 performs the weight synchronization 854 which is an operation for synchronizing with the "multi-AP-CJT weight" calculated by the AP #1 on the basis of the information regarding the weight the AP #1 generates on the basis of the weight synchronization information 852.

Note that, in this example, it has been described that the AP #2, for which the weight synchronization information 852 is performed, calculates the "multi-AP-CJT weight" in the weight synchronization 854, but the calculation may not be performed only in the weight synchronization 854.

For example, when the weight calculation 851 is performed by the AP #1, the AP #2 may also calculate the "multi-AP-CJT weight" on the basis of the information held by the AP #2 itself, and after the weight synchronization information 852 is performed, the AP #2 may perform the weight calculation and the calculation for correction again.

The operation of the weight synchronization 854 will be described below. Here, the AP #1 obtains the feedback information of STA #1 to STA #(k+1), and the AP #2 obtains the feedback information of STA #1 to STA #k and STA #(k+2) by the joint sounding 821. $w_{m(1)}^{(f_l)}$ indicates "multi-AP-CJT weight" with respect to STA$_m$ and a frequency $f_l$, which is generated by the AP #1 with its own numerical algorithm on the basis of the feedback information, and $w_{m(2)}^{(f_l)}$ indicates the "multi-AP-CJT weight" similarly generated by the AP #2 with its own algorithm. Each AP generates $w_m^{(f_l)}$ with an algorithm as shown in Formulas 2 to 4, but may be generated by another algorithm.

Here, among all the "multi-AP-CJT weights" generated by the AP #1 and the AP #2 on the basis of the feedback information held by the AP #1 and the AP #2 themselves, the "multi-AP-CJT weights" of the terminals (that is, STAs #1 to #k) commonly held by the AP #1 and the AP #2 are represented by in Formulas 5 and 6, respectively. That is, $W_{(1)}^{(f_l)}$ calculated by Formula 5 is a weight held by the sharing AP (AP #1), and $W_{(2)}^{(f_l)}$ calculated by Formula 6 is a weight held by the shared AP (AP #2).

[Mathematical formula 5]

$$W_{(1)}^{(f_l)} = \left[ w_{a_1(1)}^{(f_l)} w_{a_2(1)}^{(f_l)} \ldots w_{a_k(1)}^{(f_l)} \right] = \begin{bmatrix} \gamma_{a_1}^{(f_l)} & & \\ & \ddots & \\ & & \gamma_{a_k}^{(f_l)} \end{bmatrix} \left[ u_{a_1(1)}^{(f_l)} u_{a_2(1)}^{(f_l)} \ldots u_{a_k(1)}^{(f_l)} \right]$$

s.t. $a_i \in \{1, 2, \ldots, k\}$

[Mathematical formula 6]

$$W_{(2)}^{(f_l)} = \left[ w_{b_1(2)}^{(f_l)} w_{b_2(2)}^{(f_l)} \ldots w_{b_k(2)}^{(f_l)} \right] = \begin{bmatrix} \gamma_{b_1}^{(f_l)} & & \\ & \ddots & \\ & & \gamma_{b_k}^{(f_l)} \end{bmatrix} \left[ u_{b_1(2)}^{(f_l)} u_{b_2(2)}^{(f_l)} \ldots u_{b_k(2)}^{(f_l)} \right]$$

s.t. $b_i \in \{1, 2, \ldots, k\}$ where for $w_{am(1)}^{(f_l)}$ and $w_{bm(2)}^{(f_l)}$, matrices obtained by normalizing column vectors are represented as $u_{am(1)}^{(f_l)}$ and $u_{bm(2)}^{(f_l)}$, respectively, and $\gamma_{am}^{(f_l)}$ and $\gamma_{bm}^{(f_l)}$ represent diagonal matrices obtained by multiplying each column of $u_{am(1)}^{(f_l)}$ and $u_{bm(2)}^{(f_l)}$ by a constant.

The AP #1 and the AP #2 each calculate "multi-AP-CJT weight" $w_m^{(f_l)}$, but $w_{m(1)}^{(f_l)}$ and $w_{m(2)}^{(f_l)}$ have a relationship multiplied by a complex constant with each other by using a numerical calculation algorithm as shown in Formulas 5 and 6, or have a degree of freedom such that the order of column vectors is different although column vectors of $w_{m(1)}^{(f_l)}$ and $w_{m(2)}^{(f_l)}$ are the same.

Specifically, even when $a_1(1)=b_1(2)$ is satisfied with respect to $u_{a1(1)}^{(f_l)}$ and $u_{b1(2)}^{(f_l)}$ represented by Formulas 5 and 6, there is a case where the order of the column vectors is different from each other, or the column vectors do not completely coincide with each other, for example, an arbitrary $\theta_1$ and an imaginary unit j are multiplied by $e^{j\theta_1}$. At this time, $W_{(1)}^{(f_l)}$ and $W_{(2)}^{(f_l)}$ have a relationship shown in Formula 7.

[Mathematical formula 7]

$$\begin{bmatrix} \gamma_{a_1}^{(f_l)} & & \\ & \ddots & \\ & & \gamma_{a_k}^{(f_l)} \end{bmatrix}$$

$$\begin{bmatrix} \Theta_{a_1}^{(f_l)} & & \\ & \ddots & \\ & & \Theta_{a_1}^{(f_l)} \end{bmatrix} \begin{bmatrix} \gamma_{b_1}^{((f_l))^{-1}} & & \\ & \ddots & \\ & & \gamma_{b_k}^{((f_l))^{-1}} \end{bmatrix} W_{(2)}^{(f_l)} =$$

$$\begin{bmatrix} \gamma_{a_1}^{(f_l)} & & \\ & \ddots & \\ & & \gamma_{a_k}^{(f_l)} \end{bmatrix} \begin{bmatrix} \Theta_{a_1}^{(f_l)} & & \\ & \ddots & \\ & & \Theta_{a_1}^{(f_l)} \end{bmatrix} C \left[ u_{b_1(2)}^{(f_l)} u_{b_2(2)}^{(f_l)} \ldots u_{b_k(2)}^{(f_l)} \right] =$$

$$\begin{bmatrix} \gamma_{a_1}^{(f_l)} & & \\ & \ddots & \\ & & \gamma_{a_k}^{(f_l)} \end{bmatrix} \left[ u_{a_1(1)}^{(f_l)} u_{a_2(1)}^{(f_l)} \ldots u_{a_k(1)}^{(f_l)} \right] = W_{(1)}^{(f_l)}$$

Formula 7

Here, a matrix C is a permutation matrix that performs an operation of rearranging $[u_{b1(2)}^{(f_l)} u_{b2(2)}^{(f_l)} \ldots u_{bk(2)}^{(f_l)}]$ in order of the same column vector as a stream intended by each column vector of $[u_{a1(2)}^{(f_l)} u_{a2(2)}^{(f_l)} \ldots u_{ak(2)}^{(f_l)}]$. Furthermore, $\theta_{a1}^{(f_l)}$ indicates a diagonal matrix, and each diagonal component is represented by $e^{j\theta}$ for any different complex phase $\theta$.

In general, $u_{am(1)}^{(f_l)}$ and $u_{bm(2)}^{(f_l)}$ are obtained in a numerical calculation, have a relationship multiplied by a complex constant as described above, and notification of $\theta_{am}^{(f_l)}$, $\gamma_{am}^{(f_l)}, \gamma_{bm}^{(f_l)}$, and c (m∈ $\{a_1, \ldots, a_k\}$), which are coefficients for correcting this, are performed among the multiple APs. Therefore, the "multi-AP-CJT weight" generated in each AP can be matched.

Figure 7:
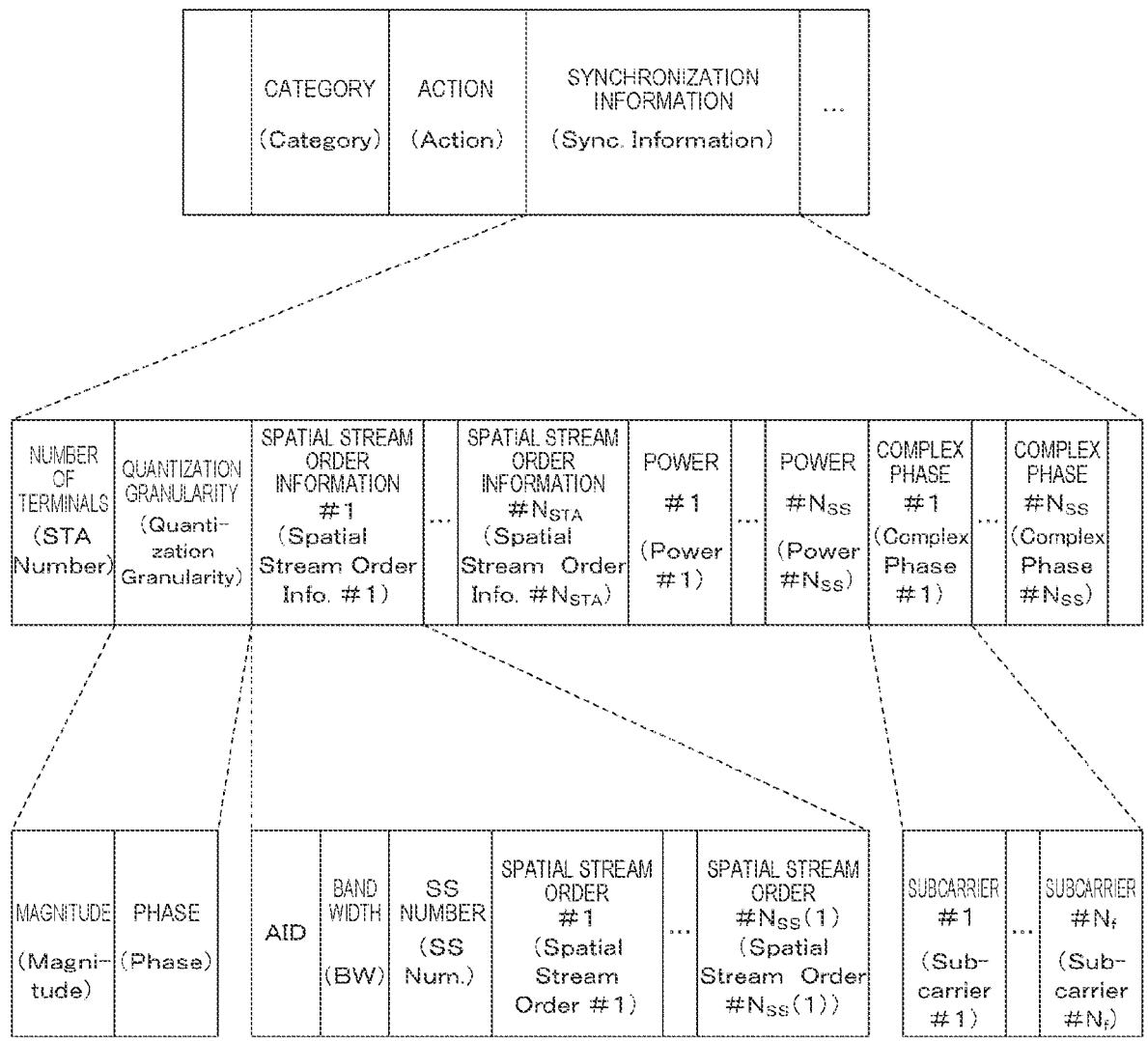
FIG. 7 is a diagram illustrating a configuration example of a frame notification of which is performed in weight synchronization information 852 according to an embodiment of the present technology.

FIG. 7 is a diagram illustrating a configuration example of a frame notification of which is performed in the weight synchronization information 852 according to the embodiment of the present technology.

In the weight synchronization information 852, notification of a parameter for synchronization with the "multi-AP-CJT weight" held by a notification source AP is performed when the AP notification of which is performed calculates the "multi-AP-CJT weight". Note that a calculation example of the weight synchronization 854 is shown in the above-described Formula 7, but is not limited thereto.

A notification frame of the weight synchronization information 852 includes a "category", an "action", and "synchronization information", but components are not limited to these.

The "category" and the "action" are similar to those in the algorithm synchronization 815 described above.

The "synchronization information" includes information indicating a parameter necessary for the AP notified of the main frame to perform the weight synchronization 854. The "synchronization information" includes one or more of the "number of terminals", "quantization granularity", "spatial stream order information", a "power", and a "complex phase".

Note that, hereinafter, for convenience, an AP to which notification of the weight synchronization information 852 is performed is set to the AP #1, and an AP to which the weight synchronization information 852 is to be sent is set to the AP #2. However, the AP #2 may perform notification of the weight synchronization information 852, and the destination target of the notification may be set to the AP #1.

The "number of terminals" (STA number) includes information indicating the number of desired terminals the AP #1 sets as the destination in the CJT.

The "quantization granularity" includes a value indicating resolution of values included in the subsequent "power" and "complex phase".

The "spatial stream order information" (spatial stream order information #1 to #$N_{STA}$) includes information regarding the "multi-AP-CJT weight" for the different $N_{STA}$ terminals, which is calculated by the AP #1.

The "power" (power #1 to #$N_{SS}$) includes information regarding the magnitude of the "multi-AP-CJT weight" for different $N_{SS}$ streams, which is calculated by the AP #1.

The "complex phase" (complex phases #1 to #$N_{SS}$) includes information regarding the magnitude of the "multi-AP-CJT weight" for different $N_{SS}$ streams, which is calculated by the AP #1.

Note that the information included in the "number of terminals" may be a value indicating "$N_{STA}$" which is the number of fields of the subsequent "spatial stream order information".

Furthermore, the "quantization granularity" may include at least one of "magnitude" or "phase". The "magnitude" includes a value indicating the resolution of the value included in the "power". The "phase" includes a value indicating the resolution of the value included in the "complex phase". Note that the "magnitude" and the "phase" are not defined, and the resolution of the value included in the "power" and the resolution included in the "complex phase" may be indicated as one value.

Furthermore, the "spatial stream order information" includes at least one of an "AID", a "band width", an "SS number", or "spatial stream order".

The "AID" includes information indicating a terminal which is a target of the information regarding the channel indicated in each "spatial stream order information".

The "band width" (BW) includes information indicating the number of "subcarriers" included in the frequency channel and the subsequent "complex phase".

The "SS number" includes information indicating "$N_{SS}$" which is the number of "spatial stream order" in the same "spatial stream order information".

The "spatial stream order" (spatial stream order #1 to #$N_{SS}$) includes information indicating a position of the feedback vector between the AP that transmits the main frame and the terminal indicated by the "AID" in the channel matrix.

Furthermore, the "complex phase" includes "subcarrier". The "subcarrier" (subcarriers #1 to #$N_f$) includes information regarding a complex phase of an element of the feedback vector.

As a specific example, information may be stored in the "synchronization information" as below. Hereinafter, a case where the AP #1 notifies the AP #2 of the weight synchronization information 852 will be described, but the same applies to a case where the AP #2 notifies the AP #1 of the weight synchronization information 852.

In the feedback information synchronization 841 and the feedback information synchronizations 842, when the "multi-AP-CJT weight" $W_{(1)}^{(f1)}$ at a certain frequency $f_1$ calculated by the AP #1 is represented by Formula 5 described above, information indicating "k" is stored in the "number of terminals", information indicating a minimum unit or resolution expressed by the subsequent "power" or "complex phase" is stored in the "quantization granularity", and information regarding a terminal $STA_i$ to which $u_{i(1)}^{(f1)}$ is applied is stored in "spatial stream order #i".

In particular, in the "spatial stream order #i", a bit string calculated from a MAC address of the terminal $STA_i$ is indicated in the "AID"; information indicating the frequency channel of the terminal $STA_i$ applied at the time of the CJT and information indicating the number $N_f(i)$ of fields of the "subcarrier" included in the "complex phase #i" are indicated in the "band width"; information indicating the number of columns of the matrix of $u_{ai}^{(1)}$ is indicated in the "SS number"; and information indicating a column number of each column vector of $u_{i(1)}^{(f1)}$ for $[u_{a1(1)}^{(f1)} \; u_{a2(1)}^{(f1)} \ldots u_{ak(1)}^{(f1)}]$ in Formula 5 is indicated in "spatial stream order information #1 to #$N_{SS}(i)$".

Furthermore, the "power" includes information regarding diag $[\gamma_{a1(1)}^{(f1)} \; \gamma_{a2(1)}^{(f1)} \ldots \gamma_{ak(1)}^{(f1)}]$, and the "complex phase #i" includes information regarding $u_{i(1)}^{(f1)}$ at the frequency $f_i$. Here, diag [x] represents a diagonal matrix having each element of the vector x as a diagonal component.

As a specific example, information indicating a complex phase for an element of the first row in each column vector of $u_{i(1)}^{(f1)}$ is stored in the "complex phase #i", and when a (m, m)-th component of diag $[\gamma_{a1(1)}^{(f1)} \; \gamma_{a2(1)}^{(f1)} \ldots \gamma_{ak(1)}^{(f1)}]$ is set to $\gamma^{(f1)}$ (m, m), information indicating a value represented by the following Formula 8 is stored in the "power #m".

[Mathematical formula 8]

$$\frac{1}{N_f}\sum_{k=1}^{N_f}|\gamma^{(f_k)}(m,m)|^2 \qquad \text{Formula 8}$$

At this time, for example, when an arbitrary "subcarrier" of the "complex phase #i" is represented by $N_b$ bits and a value of the i-th bit in the "subcarrier" is X(i), the complex phase may be interpreted as in the following Formula 9.

[Mathematical formula 9]

$$\frac{K}{2^{N_b}}\sum_{i=1}^{N_b}2^{(i-1)}\delta(X(i)), \text{ s.t. } \delta(x)=\begin{cases}1, & x=0\\0, & x\neq 0\end{cases} \qquad \text{Formula 9}$$

At this time, information indicating "$N_b$" or "K" may be included in the "quantization granularity". Furthermore, bit information stored in the "power" may be interpreted in a similar manner to Formula 9.

[Joint Transmission]

After the AP #2 performs the weight synchronization 854, the AP #1 and the AP #2 perform joint transmission (JT) 859 for the communication terminal group 210. In this joint transmission 859, either coherent JT (CJT) in which the AP #1 and AP #2 serving as one virtual AP perform transmission or non coherent JT (NCJT) in which the AP #1 and the AP #2 form streams independently of each other and perform transmission may be performed.

The AP that performs the joint transmission 859 needs to align a transmission timing between the APs. Therefore, immediately before the joint transmission 859 is performed, the AP #1 or the AP #2 may notify an AP performing the joint transmission 859 that the joint transmission 859 is performed. As a specific example, a trigger frame indicating a start time of the joint transmission 859 may be transmitted, and the joint transmission 859 may be performed at the time indicated by the trigger frame.

As described above, in the first embodiment of the present technology, the AP #1 and the AP #2, which perform the joint transmission 859, calculate weights, respectively, and one of the AP #1 and the AP #2 notifies the other of the AP #1 and the AP #2 of a parameter necessary for synchronization with the weight synchronization information 852 to perform the weight synchronization 854. Therefore, the mismatch of the weights between the APs can be resolved, and the joint transmission 859 can be performed.

2. Second Embodiment

Figure 8:
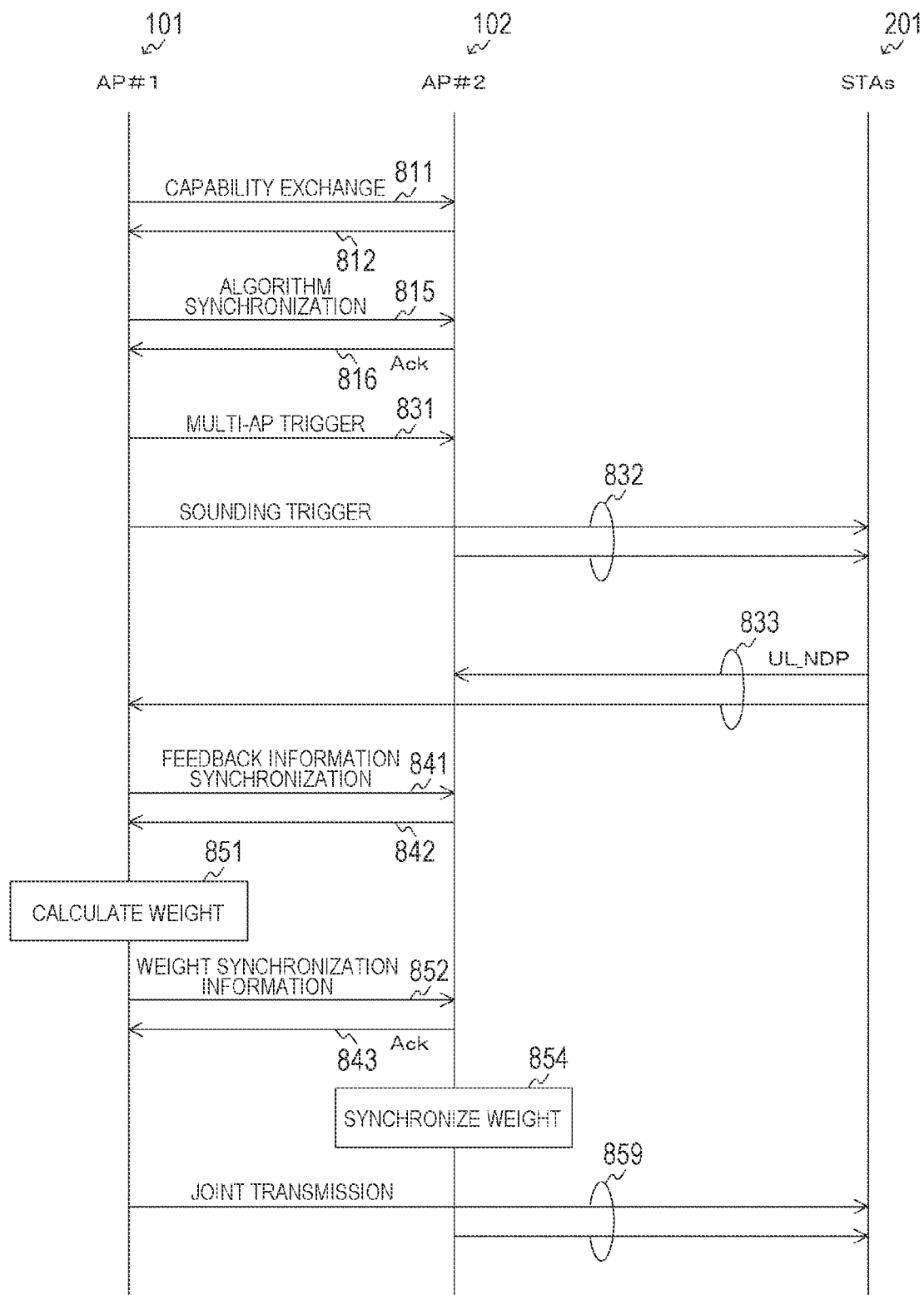
FIG. 8 is a sequence diagram illustrating an operation example of a wireless network system according to a second embodiment of the present technology.

FIG. 8 is a sequence diagram illustrating an operation example of a wireless network system according to the second embodiment of the present technology.

In the first embodiment described above, the reference signal is transmitted from the multi-AP by the joint sounding 821, and notification of the feedback information based on the reference signal is performed from the communication terminal group 210 by explicit feedback. On the other hand, in the second embodiment, arbitrary APs configuring the multi-AP perform a sounding trigger 832 for the communication terminal group 210. With this as a trigger, the communication terminal group 210 notified of the sounding trigger 832 performs UL_NDP 833 for the multi-AP and transmits a reference signal. In this manner, each AP estimates CSI with the terminal by using the reference signal of the UL_NDP 833 induced by the sounding trigger 832.

Here, a multi-AP trigger 831, the sounding trigger 832, and the UL_NDP 833, which are the differences from the first embodiment described above, will be described.

Note that, in this example, a case where the sounding trigger 832 is performed by each of the APs (AP #1 and AP #2) configuring the multi-AP is described, but the sounding trigger is not necessarily performed by all the APs, and may be performed by either the AP #1 or the AP #2. In this case, the multi-AP trigger 831 may not be performed.
[Multi-AP Trigger]

In a case where a plurality of the APs configuring the multi-AP simultaneously performs the sounding trigger 832, in the multi-AP trigger 831, a reference signal for performing frequency synchronization and time synchronization between the APs is performed. In this example, a case where the AP #1 performs the multi-AP trigger 831 for the AP #2 is described, but the AP #2 may perform the multi-AP trigger for the AP #1.
[Sounding Trigger]

Arbitrary APs configuring the multi-AP perform the sounding trigger 832 for requesting an arbitrary communication terminal group 210 to perform the UL_NDP 833.
[UL_NDP]

In the sounding trigger 832, the communication terminal group 210, which has been notified of a request of performing UL_NDP 833, performs the UL_NDP 833 for the multi-AP. The frame notification of which is performed by the UL_NDP 833 may be a null data packet (NDP) defined in IEEE 802.11.

Note that, in a case where the sounding trigger 832 includes information indicating that a plurality of terminals simultaneously performs the UL_NDP 833, it may be determined that the terminal, which has received the sounding trigger 832, performs the UL_NDP 833 only in a case where the frequency synchronization can be performed for an arbitrary AP of the multi-AP within 350 Hz.

As described above, according to the second embodiment of the present technology, the channel state information can be estimated in each AP by causing the communication terminal group 210 to transmit the known signal by the UL_NDP 833 when the sounding is performed.

3. Third Embodiment

Figure 9:
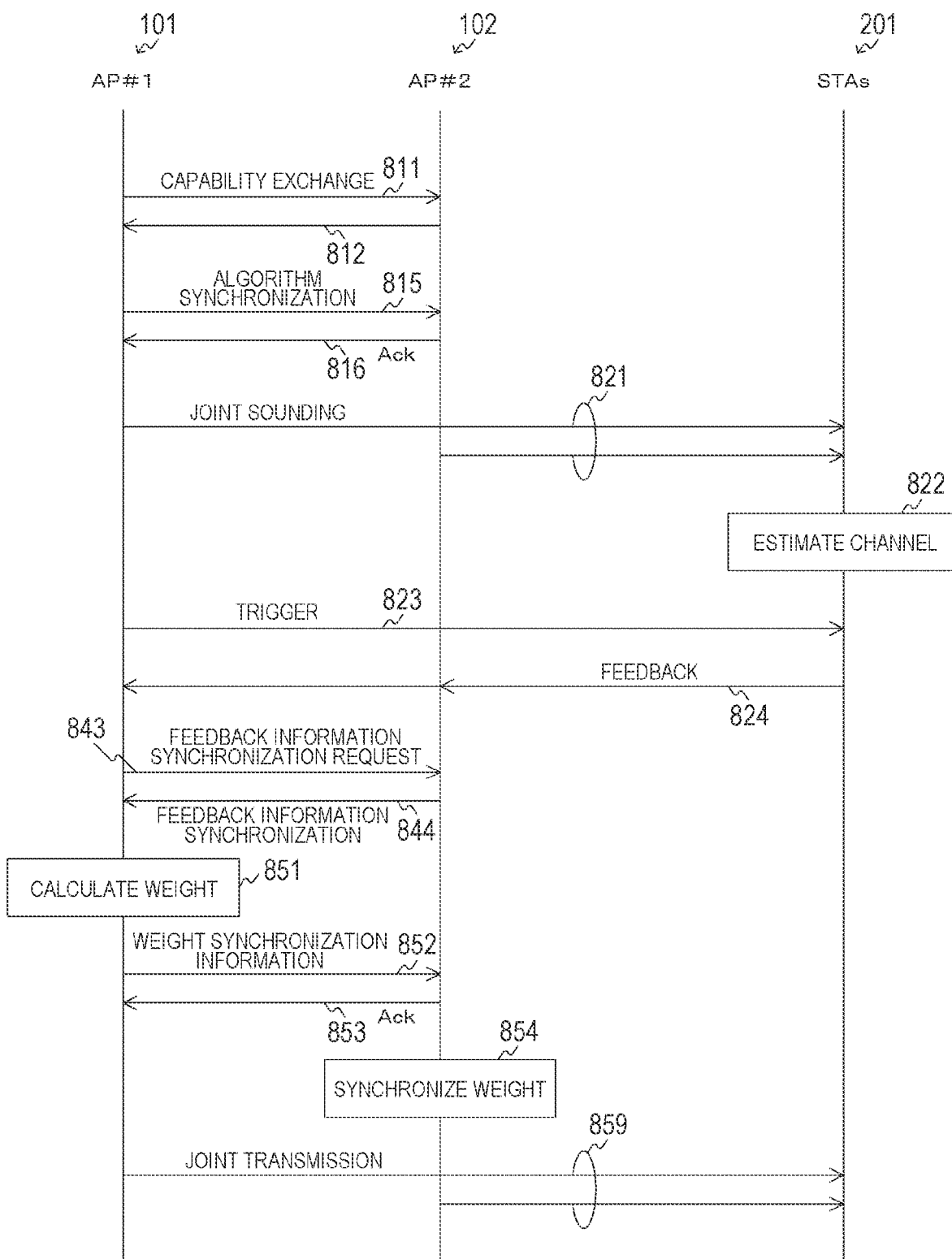
FIG. 9 is a sequence diagram illustrating an operation example of a wireless network system according to a third embodiment of the present technology.

FIG. 9 is a sequence diagram illustrating an operation example of a wireless network system according to the third embodiment of the present technology.

In the first embodiment described above, the feedback information synchronization 841 and the feedback information synchronization 842 are performed bidirectionally between the AP #1 and the AP #2, but in the third embodiment, feedback information synchronization 844 is performed in one direction only from the AP #2. Then, prior to the feedback information synchronization 844, a feedback information synchronization request 843, which is an information notification requesting the AP #1 to perform the feedback information synchronization 844 for the AP #2, is performed.

However, the feedback information synchronization request 843 may be performed by the AP #2 so as to be in the same direction as that in the first embodiment described above, and thereafter, the AP #1 may perform the feedback information synchronization 844 for the AP #2.

FIG. 10 is a diagram illustrating a configuration example of a frame notification of which is performed in the feedback information synchronization request 843 according to the embodiment of the present technology.

The notification frame of the feedback information synchronization request 843 is used to notify a destination terminal of a request of performing the feedback information synchronization 844. The main frame includes "frame control", a "length", and a "synchronization request".

The "frame control" includes information indicating that the main frame is a frame notification of which is performed as the feedback information synchronization request 843. The "length" includes information regarding a bit length of the main frame. The "synchronization request" includes information indicating a request of performing the feedback information synchronization 844.

Note that in the "frame control", it may be indicated that the main frame is a frame notification of which is performed as the feedback information synchronization request 843 together with values of other fields.

As a specific example, the "synchronization request" may indicate "one" in a case where the destination terminal is requested to perform the feedback information synchronization 844, and otherwise, may indicate "zero".

As described above, according to the third embodiment of the present technology, another AP can perform the feedback information synchronization 844 for the AP that has performed the feedback information synchronization request 843.

4. Fourth Embodiment

Figure 11:
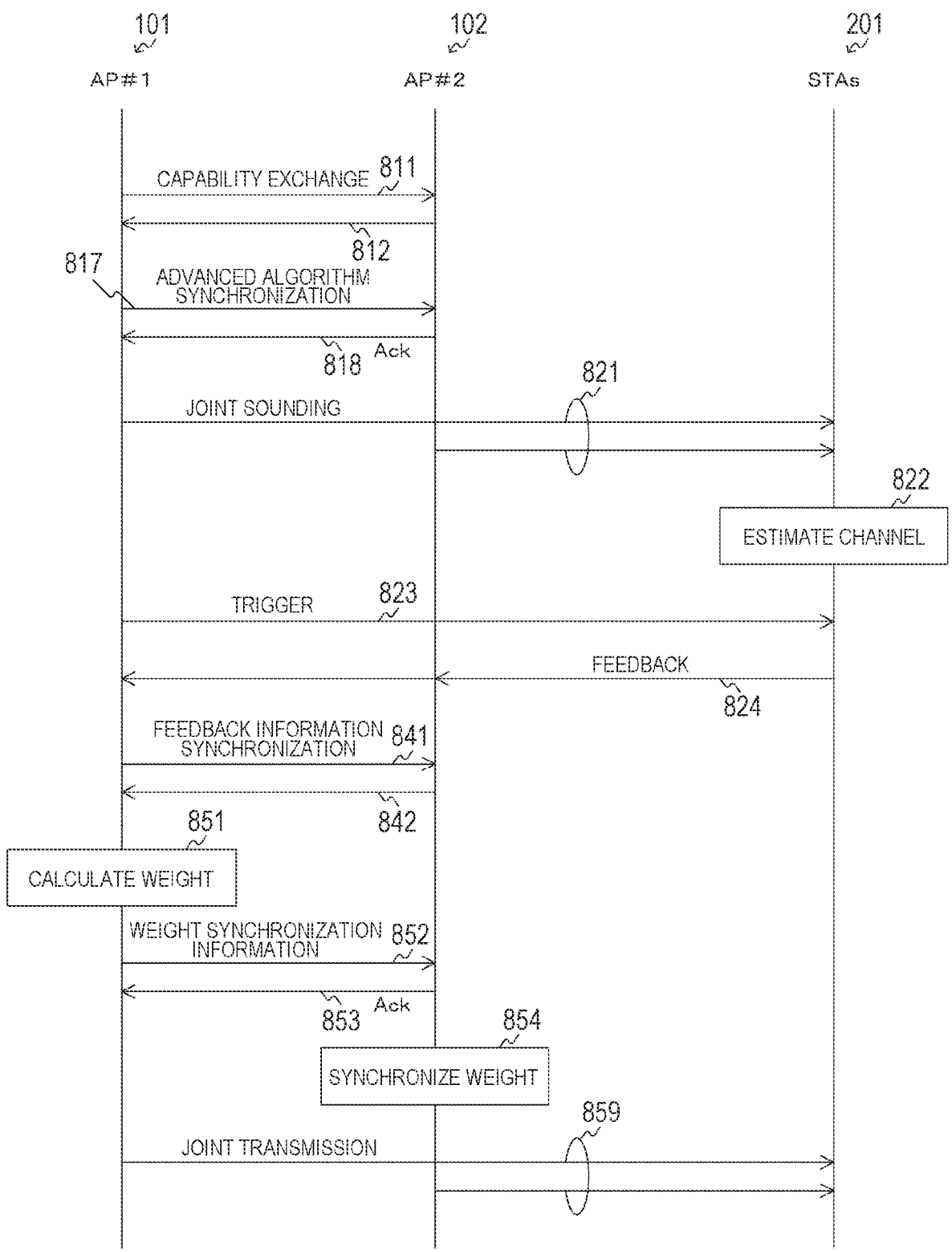
FIG. 11 is a sequence diagram illustrating an operation example of a wireless network system according to a fourth embodiment of the present technology.

FIG. 11 is a sequence diagram illustrating an operation example of a wireless network system according to the fourth embodiment of the present technology.

In the fourth embodiment, advanced algorithm synchronization 817 obtained by extending the algorithm synchronization 815 in the first embodiment described above is performed. That is, in the notification of information regarding whether or not the calculation algorithm for the CJT weight in each AP can be performed, the amount of information necessary for weight synchronization is further reduced by further specifying details of calculation for an algorithm such as eigenvalue decomposition or a Gram-Schmidt orthonormalization method. Note that in the fourth embodiment, since a highly accurate value can be obtained by an advanced algorithm, both the weight synchronization information 852 and the weight synchronization 854, which are illustrated in the drawing, do not necessarily need to be performed.

[Capability Exchange]

In the fourth embodiment, in addition to the first embodiment described above, the AP #1 and the AP #2 notify each other of information indicating whether or not the "multi-AP-CJT weight" can be calculated on the basis of the information notification of which is performed in the advanced algorithm synchronization 817 through the capability exchange 811 and capability exchange 812.

Figure 12:
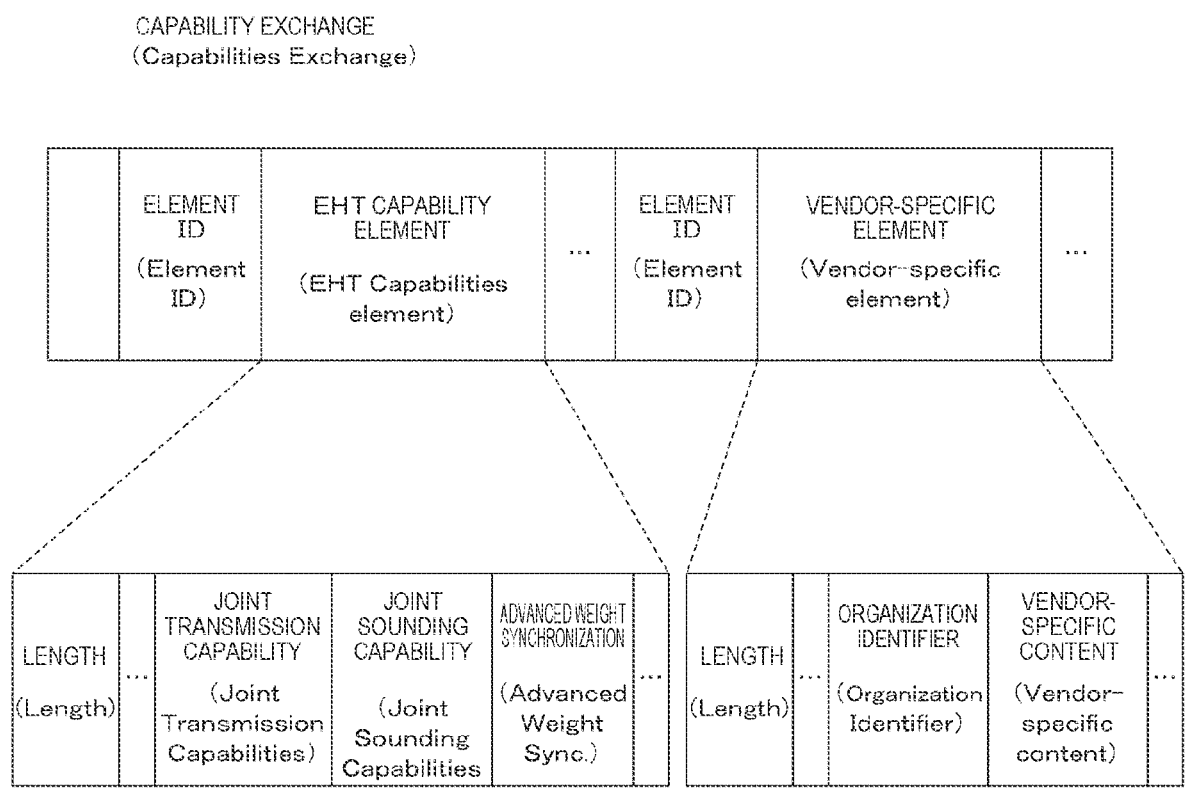
FIG. 12 is a diagram illustrating a configuration example of a frame notification of which is performed in capability exchange 811 and capability exchange 812 according to the fourth embodiment of the present technology.

FIG. 12 is a diagram illustrating a configuration example of a frame notification of which is performed in the capability exchange 811 and capability exchange 812 according to the fourth embodiment of the present technology.

In the notification frames of the capability exchange 811 and capability exchange 812 in the fourth embodiment, in the "advanced weight synchronization", notification of information indicating whether or not the "multi-AP-CJT weight" can be calculated is performed to each other on the basis of the information notification of which is performed in the advanced algorithm synchronization 817. For example, "one" may be indicated when calculation is possible, and otherwise, "zero" may be indicated.

Note that not only "one" may indicate that calculation is possible, but also details regarding the numerical calculation algorithm such as eigenvalue decomposition or a Gram-Schmidt orthonormalization method may be specified. In this case, the advanced algorithm synchronization 817 may not be performed as long as necessary information is transmitted.

[Advanced Algorithm Synchronization]

The AP #1 performs the advanced algorithm synchronization 817 as a notification of information regarding an algorithm (eigenvalue decomposition, a Gram-Schmidt orthonormalization method, or the like) used in calculation of the "multi-AP-CJT weight".

Unlike the algorithm synchronization 815 of the first embodiment described above, notification of information regarding reducing the amount of information notification of which is performed in the weight synchronization information 852 is performed to the algorithm to be used. As a specific example, for the eigenvalue decomposition and the Gram-Schmidt orthonormalization method, notification of the following information is performed.

For example, in the eigenvalue decomposition used when the "multi-AP-CJT weight" is calculated, notification that an eigenvector for an eigenvalue having a complex phase designated in the advanced algorithm synchronization 817 is calculated is performed.

Furthermore, in the Gram-Schmidt orthonormalization method used when calculating the "multi-AP-CJT weight", notification of the order of the vectors to be calculated at the time of calculation is performed. For example, the feedback vector notification of which is performed in the feedback 824 may be notified of information indicating that the calculation is performed in ascending order of the "AID".

Figure 13:
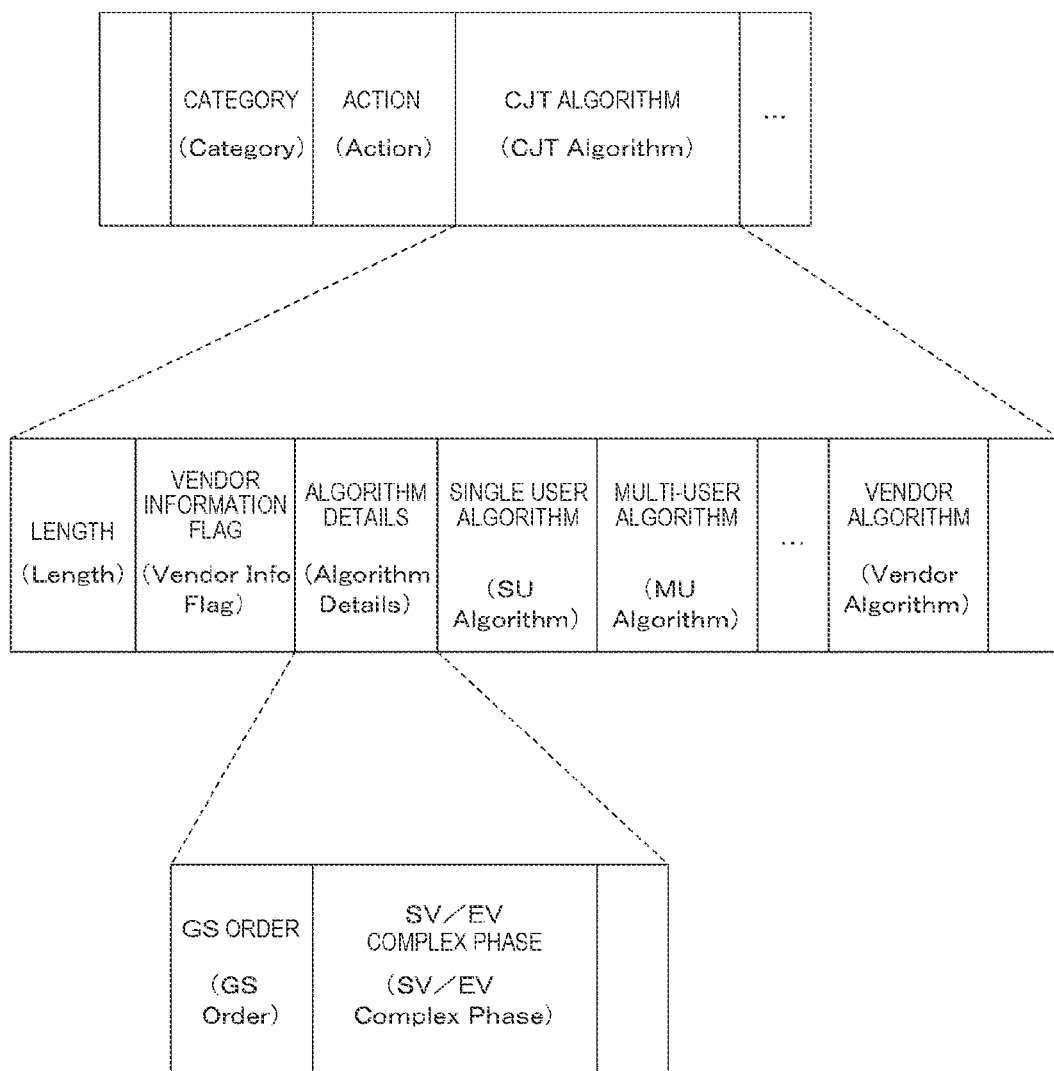
FIG. 13 is a diagram illustrating a configuration example of a frame notification of which is performed in advanced algorithm synchronization 817 according to the fourth embodiment of the present technology.

FIG. 13 is a diagram illustrating a configuration example of a frame notification of which is performed in the advanced algorithm synchronization 817 according to the fourth embodiment of the present technology.

Hereinafter, only a difference from a field configuration in the algorithm synchronization 815 of the first embodiment described above will be described.

"Algorithm details" includes information regarding numerical calculation algorithms such as eigenvalue decomposition and a Gram-Schmidt orthonormalization method. The "algorithm details" include, for example, at least one of "GS order" or an "SV/EV complex phase".

The "GS Order" includes order of vectors to be calculated at the time of calculation in the Gram-Schmidt orthonormalization method. As described above, the feedback vector notification of which is performed in the feedback 824 may be notified of information indicating that the calculation is performed in ascending order of the "AID".

The "SV/EV complex phase" includes information indicating a complex phase of an eigenvalue corresponding to an eigenvector obtained by eigenvalue decomposition or a complex phase of a singular value corresponding to a singular vector obtained by singular value decomposition.

As described above, according to the fourth embodiment of the present technology, by performing algorithm synchronization assuming a highly accurate value in the advanced algorithm synchronization 817, it is possible to omit the subsequent weight synchronization 854.

5. Fifth Embodiment

Figure 14:
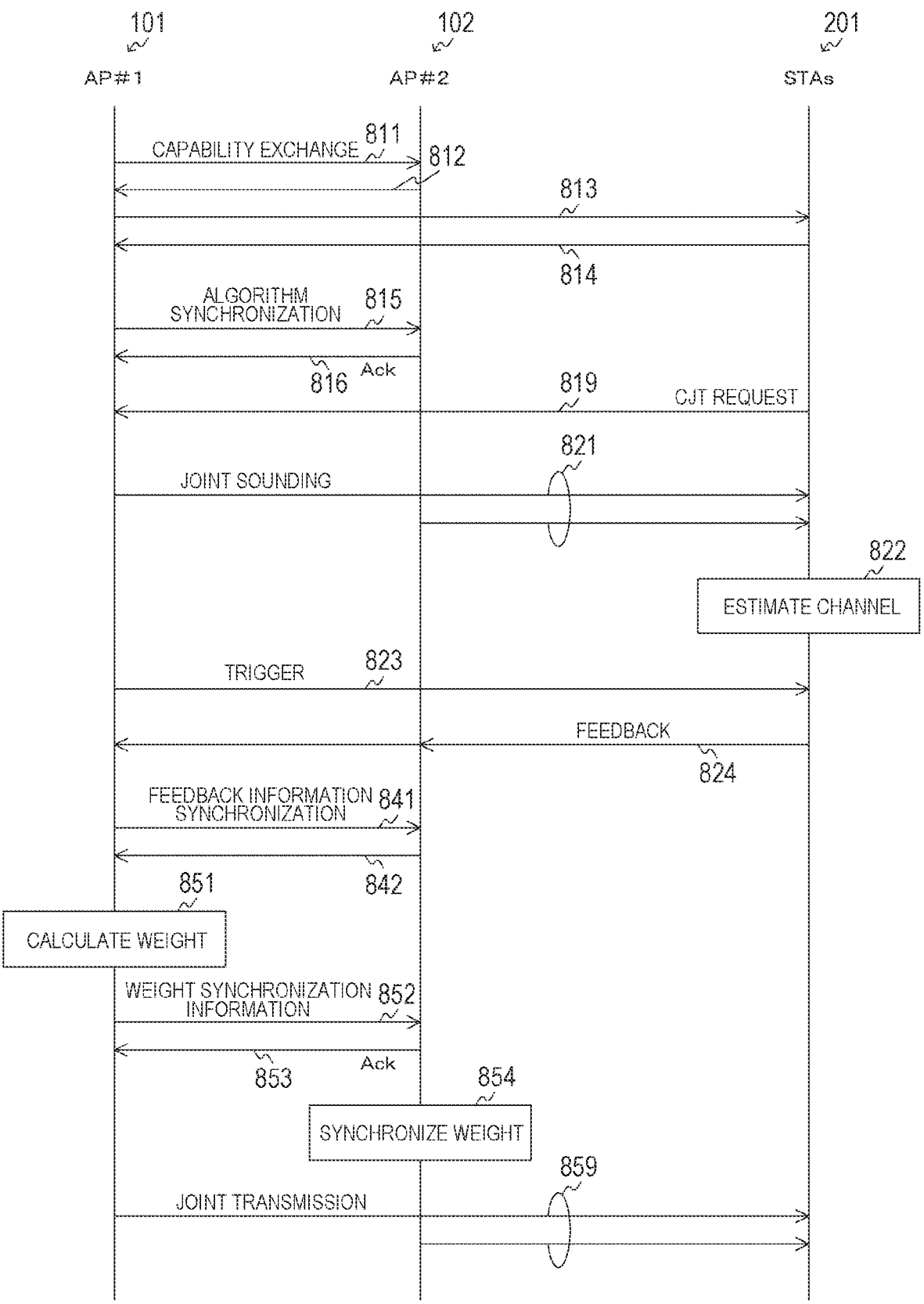
FIG. 14 is a sequence diagram illustrating an operation example of a wireless network system according to a fifth embodiment of the present technology.

FIG. 14 is a sequence diagram illustrating an operation example of a wireless network system according to the Fifth embodiment of the present technology.

The fifth embodiment is different from the first embodiment described above in that the communication terminal group 210 performs a CJT request 819 for the AP #1 or the AP #2, and that a notification regarding whether or not a CJT request 819 can be performed is performed between the multi-AP and the communication terminal group 210 by capability exchange 813 and capability exchange 814.

In this example, a case where the communication terminal group 210 performs the CJT request 819 for the AP #1 is described, but the CJT request may be performed for the AP #2 or for both the AP #1 and the AP #2. Furthermore, although the communication terminal group 210 performs the capability exchange 813 and capability exchange 814 for the AP #1, the capability exchange 813 and capability exchange 814 may be performed for the AP #2 or for both the AP #1 and the AP #2.

Note that the order of the sequences in the example of the drawing may not be as illustrated in the drawing. For example, the CJT request 819 may be performed immediately before the feedback information synchronization 841, and the capability exchange 813 and capability exchange 814 between the AP #1 and the communication terminal group 210 may be performed after the algorithm synchronization 815. Hereinafter, matters related to the CJT request 819, which is a difference from the first embodiment, will be described.

[Capability Exchange]

In the fifth embodiment, similarly to the first embodiment described above, between the APs configuring the multi-AP, the capability exchange 811 and capability exchange 814 are performed as the notification of capability of the devices itself, and the APs configuring an arbitrary multi-AP and an arbitrary terminal perform the capability exchange 811 and capability exchange 814 are performed as the notification of capability of the devices itself.

Figure 15:
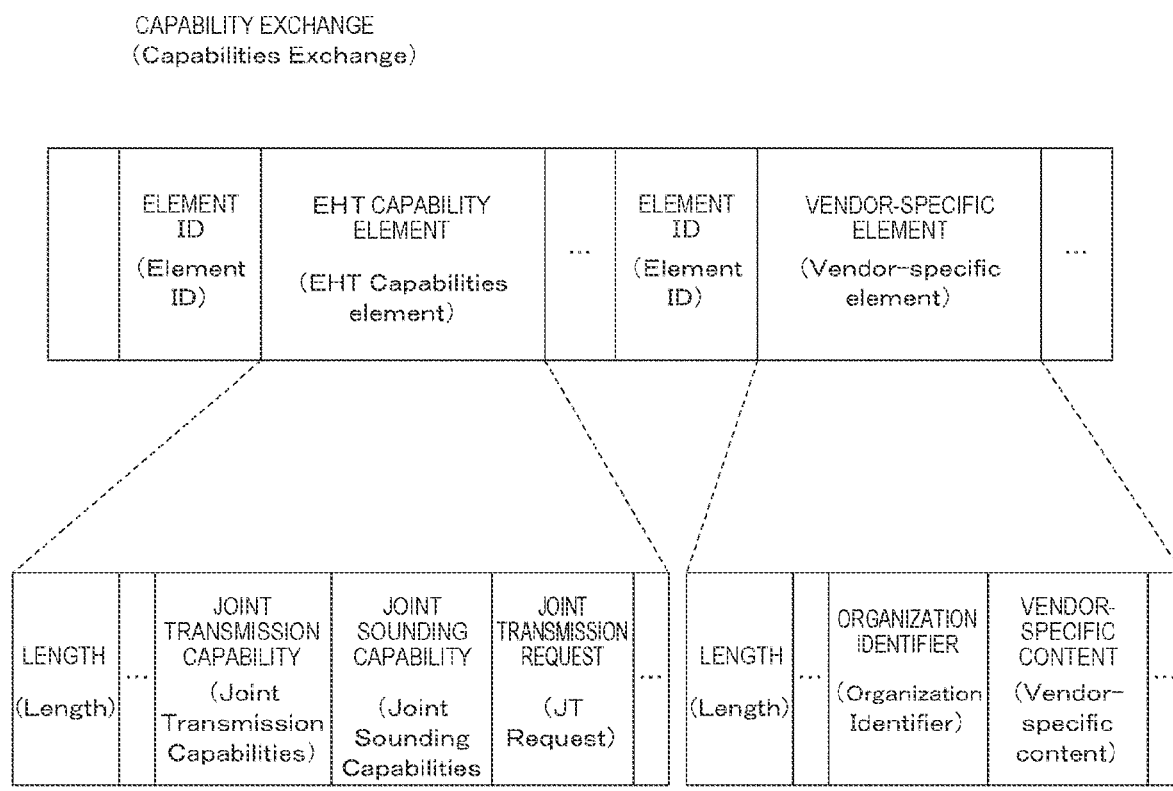
FIG. 15 is a diagram illustrating a configuration example of a frame notification of which is performed in capability exchange 811 and capability exchange 814 according to the fifth embodiment of the present technology.

FIG. 15 is a diagram illustrating a configuration example of a frame notification of which is performed in the capability exchange 811 and capability exchange 814 according to the fifth embodiment of the present technology.

Hereinafter, a "joint transmission request", which is a difference from the first embodiment, will be described. The "joint transmission request" (JT Request) includes information indicating whether or not the CJT request 819 to be described later can be performed.

As a specific example, information may be stored in the "joint transmission request" as below.

"00" indicates that the terminal performing notification of the main frame cannot perform both transmission and reception of the CJT request 819, "01" indicates that the terminal notifying the main frame can perform only transmission of the CJT request 819, "10" indicates that the terminal notifying the main frame can perform only reception of the CJT request 819, and "11" indicates that the terminal notifying the main frame can perform both transmission and reception of the CJT request 819.

[CJT Request]

In the multi-AP for which the CJT can be performed, an arbitrary communication terminal group 210 performs the CJT request 819, which is a notification of a request of performing the CJT, for at least one AP configuring the multi-AP. The trigger for performing the CJT request 819 may be a time at which a user using the terminal performs setting to make the CJT request 819 performed by using an application mounted on the terminal.

As a specific example, in a case where the terminal is a smartphone, it is assumed that a data rate mode can be designated by an application on the smartphone. The data rate mode that can be designated include a "normal data rate mode" in which a request not to perform the CJT is performed for the multi-AP, a "high data rate mode" in which a request of performing the CJT is performed for the multi-AP, and a "default mode" in which a request of performing the CJT is not performed for the multi-AP. In this case, after the user operating the smartphone selects a mode other than the "default mode" at an arbitrary timing, the terminal may perform the CJT request 819 when the transmission right has been acquired.

Figure 16:
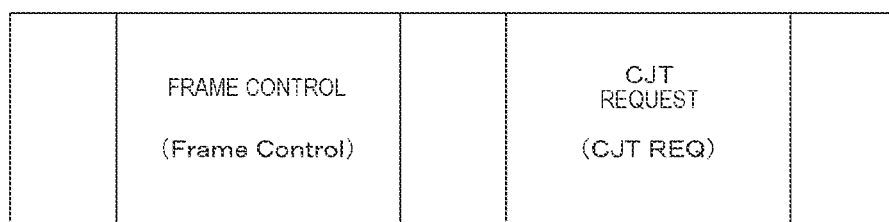
FIG. 16 is a diagram illustrating a configuration example of a frame notification of which is performed in a CJT request 819 according to the fifth embodiment of the present technology.

FIG. 16 is a diagram illustrating a configuration example of a frame notification of which is performed in the CJT request 819 according to the fifth embodiment of the present technology.

The main frame includes "frame control" and a "CJT request", but the components may not be limited to these.

The "frame control" includes information indicating that the main frame is a frame to be notified as the CJT request 819.

The "CJT request" includes information regarding a request of performing CJT. As a specific example, the "CJT request" may store the following information. That is, in a case where the "CJT request" indicates "zero", the terminal performing notification of the main frame requests the destination AP not to perform the CJT. Furthermore, in a case where the "CJT request" indicates "one", the terminal performing notification of the main frame requests the destination AP to perform the CJT.

[Feedback]

The feedback 824 is similar to that of the first embodiment described above. However, in the CJT request 819, the terminal that has perform the request notification indicating that the CJT is not performed does not need to perform the feedback 824.

[Feedback Information Synchronization]

The feedback information synchronization 841 and feedback information synchronization 842 are similar to those of the first embodiment described above. However, in the CJT request 819, it is not necessary to perform notification of information regarding a terminal that has performed a request not to perform the CJT. As a specific example, in the "terminal information" in the field configuration of the feedback information synchronization 841 and feedback information synchronization 842, which are illustrated in FIG. 6, information regarding the terminal that has performed a request not to perform the CJT is not stored.

As described above, according to the fifth embodiment of the present technology, by transmitting the CJT request 819 to the multi-AP from the terminal side, it is possible to request the use of joint transmission with a high data rate. Furthermore, the terminal notifies a request to perform or not to perform the CJT, and thus it is possible to reduce the amount of information required for the feedback information synchronization 841 and feedback information synchronization 842, and the weight synchronization 854.

Note that the above-described embodiments describe examples for embodying the present technology, and the matters in the embodiment and the matters specifying the invention in the claims have a correspondence relationship. Similarly, the matters specifying the invention in the claims and the matters in the embodiments of the present technology denoted by the same names as the matters specifying the invention have a correspondence relationship. However, the present technology is not limited to the embodiments, and can be embodied by making various modifications to the embodiments without departing from the gist thereof.

Furthermore, the processing procedure described in the above-described embodiment may be regarded as a method including these series of procedures, and may be regarded as a program for causing a computer to execute these series of procedures or a recording medium storing the program. As the recording medium, for example, a compact disc (CD), a mini disc (MD), a digital versatile disc (DVD), a memory card, a Blu-ray (registered trademark) disc, or the like can be used.

Note that the effects described in the present specification are merely examples and are not limited, and other effects may be provided.

Note that the present technology can also have the following configurations.

(1) A wireless base station including:
a wireless control unit that generates information regarding channel state information between a terminal which is a destination when performing joint transmission together with another wireless base station and a plurality of wireless base stations which is a transmission source of the joint transmission; and
a communication unit that transmits the information regarding the channel state information to the another wireless base station.

(2) The wireless base station according to (1), in which
the wireless control unit generates capability information regarding a communication scheme that is capable of being implemented by the wireless base station in the joint transmission and capability information regarding an algorithm that is capable of being performed by the wireless base station in weight calculation of the joint transmission, and
the communication unit transmits the capability information to the another wireless base station.

(3) The wireless base station according to (2), in which the capability information includes at least one of a preset algorithm or an independently defined algorithm, as an algorithm that is capable of being performed in the weight calculation of the joint transmission.

(4) The wireless base station according to any one of (1) to (3), in which
the wireless control unit generates use algorithm information regarding an algorithm used by the wireless base station in weight calculation of the joint transmission, and
the communication unit transmits the use algorithm information to the another wireless base station.

(5) The wireless base station according to (4), in which the use algorithm information includes at least one of information indicating an algorithm of weight calculation in a case where one terminal is set as a destination in the joint transmission, information indicating an algorithm of weight calculation in a case where a plurality of terminals is set as a destination in the joint transmission, or information indicating that a specific algorithm is used among independently defined algorithms.

(6) The wireless base station according to (4) or (5), in which
the use algorithm information includes any one of information regarding a complex phase of an eigenvector calculated in eigenvalue decomposition and information regarding operation order in a Gram-Schmidt orthonormalization method.

(7) The wireless base station according to any one of (1) to (6), in which
the wireless control unit generates weight synchronization information regarding a calculation result of a weight used by the wireless base station in the joint transmission, and
the communication unit transmits the weight synchronization information to the another wireless base station.

(8) The wireless base station according to (7), in which the weight synchronization information includes quantization granularity, spatial stream order information, a power, and a complex phase.

(9) The wireless base station according to any one of (1) to (8), in which
in a case where a request for the joint transmission is received from the terminal which is a destination of the joint transmission, the wireless control unit generates information regarding the channel state information between a specific terminal that transmits the request for the joint transmission and the plurality of wireless base stations that performs the joint transmission, and
the communication unit transmits information regarding the channel state information with only the specific terminal to the another wireless base station.

(10) A wireless base station including:
a communication unit that receives information necessary for performing joint transmission together with another wireless base station from the another wireless base station; and
a wireless control unit that generates a weight of the joint transmission on the basis of information necessary for performing the joint transmission.

(11) The wireless base station according to (10), in which the wireless control unit generates capability information regarding a communication scheme that is capable of being implemented by the wireless base station in the joint transmission and capability information regarding an algorithm that is capable of being performed by the wireless base station in weight calculation of the joint transmission, and
the communication unit transmits the capability information to the another wireless base station.

(12) The wireless base station according to (10) or (11), in which
the communication unit receives use algorithm information regarding an algorithm used by the another wireless base station in weight calculation of the joint transmission from the another wireless base station, and
the wireless control unit generates a weight of the joint transmission on the basis of the use algorithm information.

(13) The wireless base station according to (12), in which the use algorithm information includes any one of information regarding a complex phase of an eigenvector calculated in eigenvalue decomposition and information regarding operation order in a Gram-Schmidt orthonormalization method.

(14) The wireless base station according to any one of (10) to (13), in which
the communication unit receives weight synchronization information regarding a calculation result of a weight used by the another wireless base station in the joint transmission from the another wireless base station, and
the wireless control unit generates the weight of the joint transmission on the basis of the weight synchronization information.

(15) The wireless base station according to any one of (10) to (14), in which
the wireless control unit generates information regarding channel state information between a plurality of wireless base stations which is a transmission source of the joint transmission and the terminal which is a destination, in accordance with a request for information regarding channel state information from the another wireless base station, and
the communication unit transmits the information regarding the channel state information to the another wireless base station.

(16) The wireless base station according to (15), in which in a case where a request for the joint transmission is received from the terminal which is a destination of the joint transmission, the wireless control unit generates information regarding the channel state information between a specific terminal that transmits the request for the joint transmission and the plurality of wireless base stations that performs the joint transmission, and
the communication unit transmits information regarding the channel state information with only the specific terminal to the another wireless base station.

REFERENCE SIGNS LIST

100 Multi-access point (multi-AP)
101, 102 Access point (AP)
201 to 203 Communication terminal (STA)
210 Communication terminal group (STAs)
300 Wireless communication device
310 Communication unit
311 Wireless control unit
312 Data processing unit
313 Modulation and demodulation unit
314 Signal processing unit 315 Channel estimation unit
316 Wireless interface unit
317 Amplifier unit
319 Antenna
321 Control unit
322 Power supply unit
811 to 814 Capability exchange
815 Algorithm synchronization
817 Advanced algorithm synchronization
819 CJT request
821 Joint sounding
822 Channel estimation
823 Trigger
824 Feedback
831 Multi-AP trigger
832 Sounding trigger
841, 842, 844 Feedback information synchronization
843 Feedback information synchronization request
851 Weight calculation
852 Weight synchronization information
854 Weight synchronization
859 Joint transmission

The invention claimed is:

1. A processing apparatus, comprising:
circuitry configured to:
generate first capability information associated with a beamforming operation that is performed by a second communication apparatus, wherein the second communication apparatus performs the beamforming operation in cooperation with a third communication apparatus, and transmits a signal to a first communication apparatus in the beamforming operation;
generate weight synchronization information associated with a calculation result of a weight used by the second communication apparatus in the beamforming operation; and
control communication circuitry to transmit the first capability information and the weight synchronization information to the third communication apparatus.

2. The processing apparatus according to claim 1, wherein the circuitry is further configured to:
generate second capability information associated with an algorithm performed by the second communication apparatus in weight calculation of the beamforming operation; and
transmit the second capability information to the third communication apparatus.

3. The processing apparatus according to claim 2, wherein the second capability information includes at least one of a preset algorithm or an independently defined algorithm, as the algorithm that is performed by the second communication apparatus in the weight calculation of the beamforming operation.

4. The processing apparatus according to claim 1, wherein the circuitry is further configured to:
generate use algorithm information associated with a specific algorithm implemented by the second communication apparatus in weight calculation of the beamforming operation; and
transmit the use algorithm information to the third communication apparatus.

5. The processing apparatus according to claim 4, wherein the use algorithm information includes at least one of
first information that indicates a first algorithm of the weight calculation with the third communication apparatus set as a destination in the beamforming operation,
second information that indicates a second algorithm of the weight calculation with a plurality of communication apparatuses set as a destination in the beamforming operation, or
third information that indicates a third algorithm of a plurality of independently defined algorithms.

6. The processing apparatus according to claim 4, wherein the use algorithm information includes at least one of
first information associated with a complex phase of an eigenvector calculated in eigenvalue decomposition, or
second information associated with operation order in a Gram-Schmidt orthonormalization method.

7. The processing apparatus according to claim 1, wherein the weight synchronization information includes at least one of quantization granularity, spatial stream order information, a power, or a complex phase.

8. The processing apparatus according to claim 1, wherein the circuitry is further configured to:
receive a request for the beamforming operation from the first communication apparatus;
generate, based on the request for the beamforming operation, specific information associated with a channel state between the first communication apparatus and a plurality of communication apparatuses that performs the beamforming operation, wherein
the plurality of communication apparatuses comprises the second communication apparatus and the third communication apparatus, and
the first communication apparatus is a destination of the beamforming operation; and
transmit the specific information associated with the channel state to the third communication apparatus.

9. The processing apparatus according to claim 1, wherein the processing apparatus is included in the second communication apparatus.

10. The processing apparatus according to claim 9, wherein
the first communication apparatus is a communication terminal, and
the second communication apparatus and the third communication apparatus are access points.

11. The processing apparatus according to claim 1, wherein
the circuitry is further configured to:
generate specific information associated with a channel state between the first communication apparatus, and at least one of the second communication apparatus or the third communication apparatus; and
control the communication circuitry to transmit the specific information to the third communication apparatus, and
the first communication apparatus is a destination of the signal transmitted from the second communication apparatus.

12. A first communication apparatus, comprising:
circuitry configured to:
generate first capability information associated with a beamforming operation that is performed by a second apparatus, wherein the second communication apparatus performs the beamforming operation in cooperation with a third communication apparatus, and transmits a signal to the first communication apparatus in the beamforming operation;

receive, from the second communication apparatus, weight synchronization information associated with a calculation result of a weight used by the second communication apparatus in the beamforming operation;

generate the weight of the beamforming operation based on the weight synchronization information; and transmit the first capability information to the second communication apparatus.

13. The first communication apparatus according to claim 12, wherein the circuitry is further configured to:

generate second capability information associated with an algorithm performed by the first communication apparatus in weight calculation of the beamforming operation; and transmit the second capability information to the second communication apparatus.

14. The first communication apparatus according to claim 12, wherein the circuitry is further configured to:

receive, from the second communication apparatus, use algorithm information associated with an algorithm implemented by the second communication apparatus in weight calculation of the beamforming operation; and generate the weight of the beamforming operation based on the use algorithm information.

15. The first communication apparatus according to claim 14, wherein the use algorithm information includes at least one of first information associated with a complex phase of an eigenvector calculated in eigenvalue decomposition, or second information associated with operation order in a Gram-Schmidt orthonormalization method.

16. The first communication apparatus according to claim 12, wherein the circuitry is further configured to:

receive, from the third communication apparatus, a first request for specific information associated with a channel state between a plurality of communication apparatuses and the third communication apparatus;

generate, based on the first request, the specific information associated with the channel state, wherein each of the plurality of communication apparatuses is a transmission source of the beamforming operation, the third communication apparatus is a destination of the beamforming operation, and the plurality of communication apparatuses comprises the first communication apparatus and the second communication apparatus; and transmit the specific information associated with the channel state to the second communication apparatus.

17. The first communication apparatus according to claim 16, wherein the circuitry is further configured to:

receive, a second request for the beamforming operation, from the third communication apparatus;

generate, based on the second request for the beamforming operation, the specific information associated with the channel state between the third communication apparatus and the plurality of communication apparatuses that performs the beamforming operation; and transmit the specific information associated with the channel state to the second communication apparatus.

18. A processing method, comprising:

in a processing apparatus:

generating first capability information associated with a beamforming operation that is performed by a second communication apparatus, wherein the second communication apparatus performs the beamforming operation in cooperation with a third communication apparatus, and transmits a signal to a first communication apparatus in the beamforming operation;

generating weight synchronization information associated with a calculation result of a weight used by the second communication apparatus in the beamforming operation; and controlling communication circuitry to transmit the first capability information and the weight synchronization information to the third communication apparatus.

19. A non-transitory computer readable storage medium having stored thereon, computer-executable instructions which, when executed by a computer, cause the computer to execute operations, the operations comprising:

generating first capability information associated with a beamforming operation that is performed by a second communication apparatus, wherein the second communication apparatus performs the beamforming operation in cooperation with a third communication apparatus, and transmits a signal to a first communication apparatus in the beamforming operation;

generating weight synchronization information associated with a calculation result of a weight used by the second communication apparatus in the beamforming operation; and controlling communication circuitry to transmit the first capability information and the weight synchronization information to the third communication apparatus.

* * * * *